US012130573B2

(12) United States Patent
Akiyama et al.

(10) Patent No.: US 12,130,573 B2
(45) Date of Patent: Oct. 29, 2024

(54) DECURLING DEVICE, FIXING DEVICE, AND IMAGE FORMING APPARATUS

(71) Applicant: FUJIFILM Business Innovation Corp., Tokyo (JP)

(72) Inventors: Shingo Akiyama, Kanagawa (JP); Hiroaki Okuma, Kanagawa (JP); Masakatsu Eda, Kanagawa (JP); Seiji Taira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 17 days.

(21) Appl. No.: 17/326,942

(22) Filed: May 21, 2021

(65) Prior Publication Data

US 2022/0113667 A1 Apr. 14, 2022

(30) Foreign Application Priority Data

Oct. 9, 2020 (JP) ................................ 2020-171385

(51) Int. Cl.
*G03G 15/00* (2006.01)
*G03G 15/20* (2006.01)

(52) U.S. Cl.
CPC ..... *G03G 15/6576* (2013.01); *G03G 15/2028* (2013.01)

(58) Field of Classification Search
CPC .......... G03G 15/6576; G03G 15/2028; G03G 15/00662; B65H 2301/51256; B65H 2301/5121; B65H 23/34
See application file for complete search history.

(56) References Cited

U.S. PATENT DOCUMENTS 5,637,070 A * 6/1997 Sasai .................... B41J 11/0005 493/321
2014/0126945 A1* 5/2014 Uchida .............. G03G 21/1685 399/406
2016/0282793 A1* 9/2016 Kanai ................ G03G 15/6576

FOREIGN PATENT DOCUMENTS

JP 2016-164644 A 9/2016

* cited by examiner

*Primary Examiner* — Jennifer Bahls
*Assistant Examiner* — Quang X Nguyen
(74) *Attorney, Agent, or Firm* — Sughrue Mion, PLLC

(57) ABSTRACT

A decurling device includes: a pair of decurling units configured to correct curl of a recording medium by sandwiching the recording medium; a switching unit configured to switch the pair of decurling units between a first state in which a pressure contact force is relatively large and a second state in which the pressure contact force is smaller than that in the first state; a release unit configured to release a pressure contact between the pair of decurling units; and a restricting unit configured to restrict release of the pressure contact between the pair of decurling units when the pair of decurling units are in the first state.

19 Claims, 13 Drawing Sheets

DECURLING DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2020-171385 filed Oct. 9, 2020.

BACKGROUND

(i) Technical Field

The present disclosure relates to a decurling device, a fixing device, and an image forming apparatus.

(ii) Related Art

For example, JP-A-2016-164644 has proposed a technique related to an image forming apparatus including a fixing device and a decurling device.

JP-A-2016-164644 discloses an image forming apparatus including a fixing device and a decurling device (decurler). The fixing device fixes a toner image onto a recording medium. The decurling device is disposed downstream of the fixing device in a transport direction of the recording medium. The decurling device corrects curl of the recording medium onto which the toner image has been fixed by the fixing device.

SUMMARY

Aspects of non-limiting embodiments of the present disclosure relate to making it possible to restrict release of pressure contact between a pair of decurling units in a state in which a pressure contact force is relatively high.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a decurling device including: a pair of decurling units configured to correct curl of a recording medium by sandwiching the recording medium; a switching unit configured to switch the pair of decurling units between a first state in which a pressure contact force is relatively large and a second state in which the pressure contact force is smaller than that in the first state; a release unit configured to release a pressure contact between the pair of decurling units; and a restricting unit configured to restrict release of the pressure contact between the pair of decurling units when the pair of decurling units are in the first state.

BRIEF DESCRIPTION OF THE DRAWINGS

Exemplary embodiment(s) of the present disclosure will be described in detail based on the following figures. wherein.

DETAILED DESCRIPTION

Hereinafter, exemplary embodiments of the present disclosure will be described with reference to the accompanying drawings.

First Exemplary Embodiment

Figure 1:
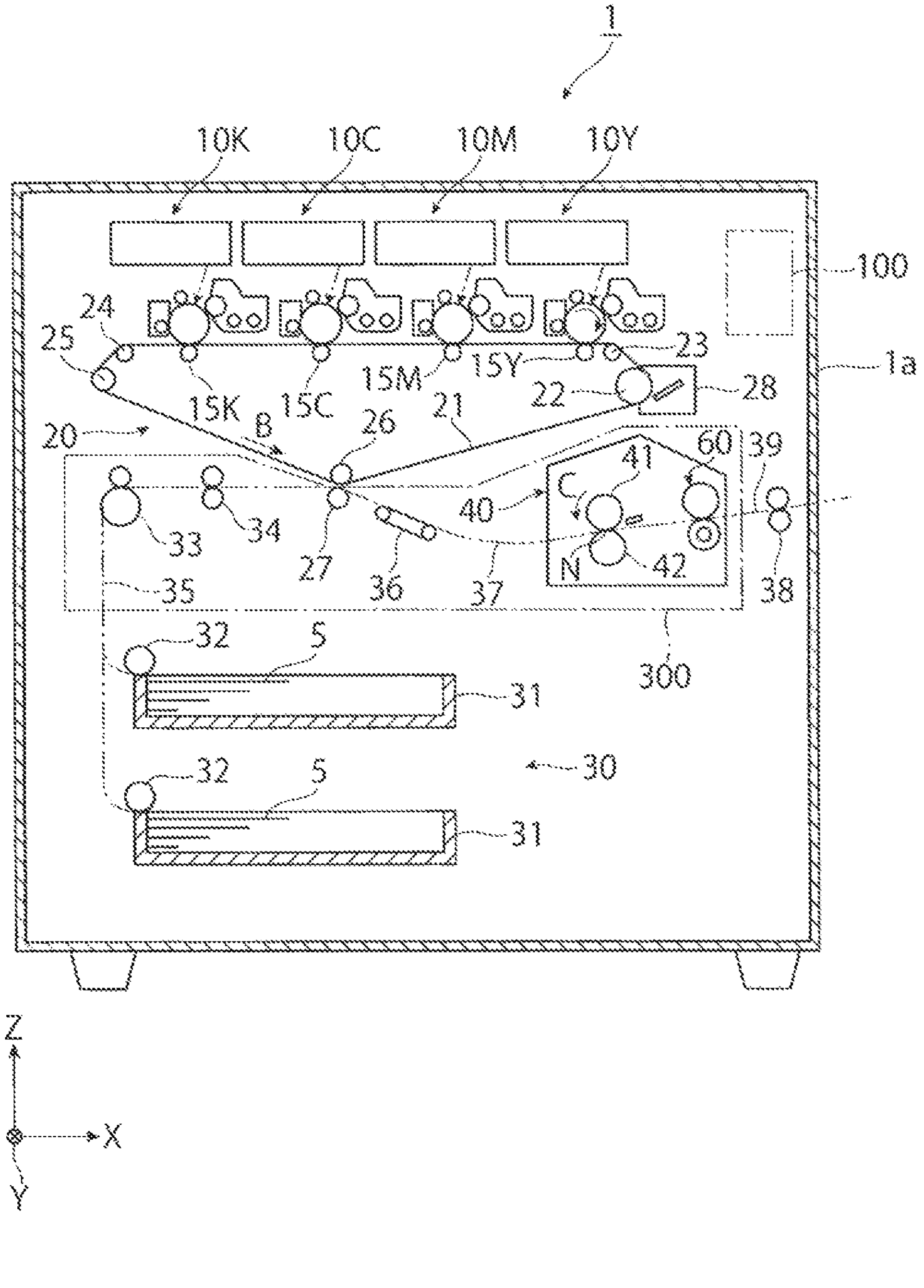
FIG. 1 illustrates an overall configuration of an image forming apparatus to which a fixing device according to a first exemplary embodiment of the present disclosure is applied.
Figure 2:
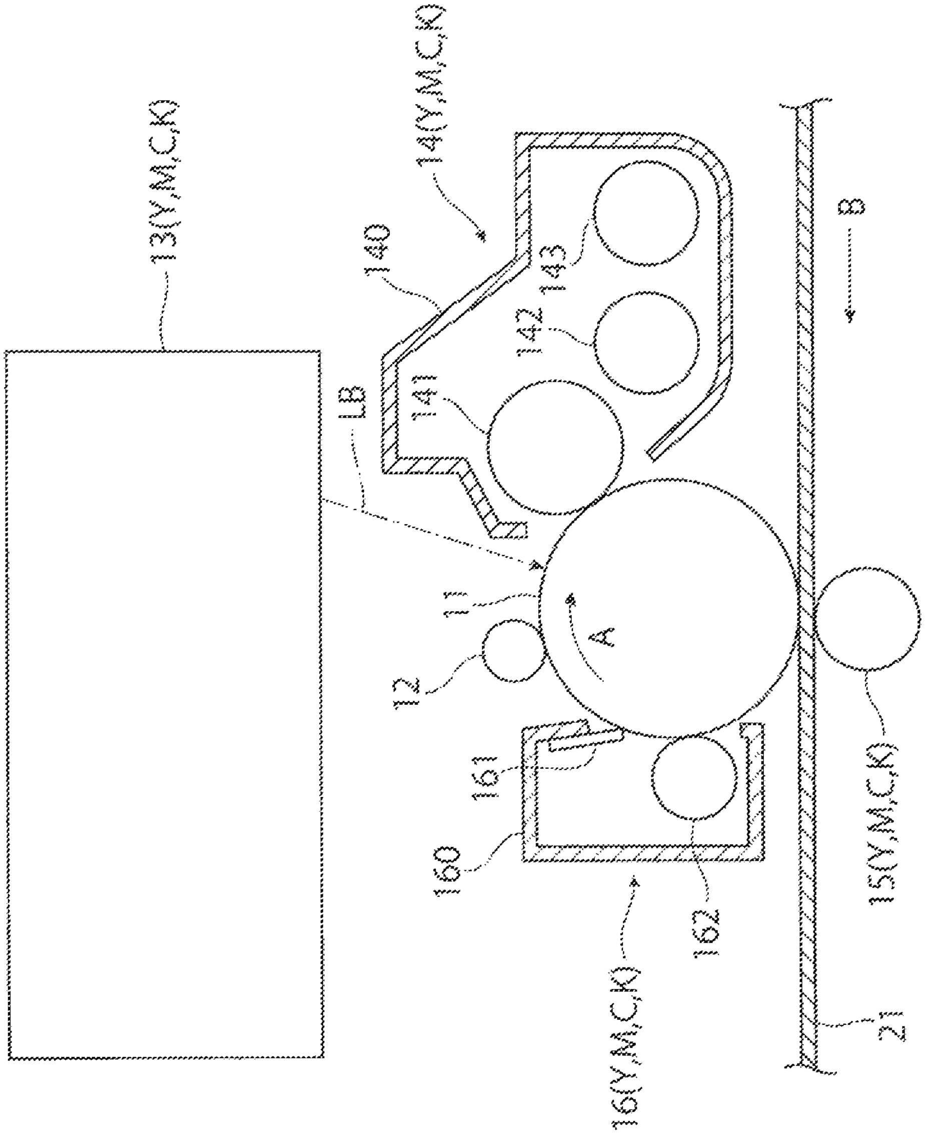
FIG. 2 illustrates an image forming device of the image forming apparatus to which the fixing device according to the first exemplary embodiment of the present disclosure is applied.

FIG. 1 illustrates an overall configuration of an image forming apparatus to which a. decurling device and a fixing device according to a first exemplary embodiment of the present disclosure are applied. FIG. 2 illustrates an image forming device of the image forming apparatus. In FIG. 1, the reference sign "X" represents a width direction along a horizontal direction. "Y" represents a depth direction along the horizontal direction, and "Z" represents a vertical direction.

Overall Configuration of Image Forming Apparatus

An image forming apparatus 1 according to the first exemplary embodiment is, for example, a color printer. As illustrated in FIG. 1. the image forming apparatus 1 includes plural image forming devices 10, an intermediate transfer device 20, a sheet feeding device 30, and a fixing device 40. The image forming devices 10 form toner images that have been developed with toners that are developers. The intermediate transfer device 20 carries the toner images formed by the respective image forming devices 10 and finally transport the toner images to a secondary transfer position where the toner images are secondarily transferred to a recording sheet 5 (an example of a recording medium). The sheet feeding device 30 accommodates and transports the recording sheets 5 to be fed to the secondary transfer position of the intermediate transfer device 20. The fixing device 40 fixes the toner images, which have been secondarily transferred by the intermediate transfer device 20, onto the recording sheet 5. In FIG. 1, a reference numeral 1*a* denotes an apparatus body of the image forming apparatus 1. The apparatus body 1*a* includes a support. structure member, an exterior cover, and the like. A two-dot chain line in the drawing indicates a main transport path. The recording sheet 5 is transported in the apparatus body 1*a* through the main transport path. In the first exemplary embodiment, the plural image forming devices 10 and the intermediate transfer device 20 constitute an image forming unit that forms an image on the recording sheet 5.

The image forming devices 10 include four image forming devices 10Y, 10M, 10C, and 10K that exclusively form toner images of four colors of yellow (Y), magenta (M), cyan (C), and black (K), respectively. The four image forming devices 10(Y, M, C, K) are arranged in a row in the horizontal direction in an internal space of the apparatus body 1*a*.

The four image forming devices 10 include the image forming devices 10(Y, M, C, K) of yellow (Y), magenta (M), cyan (C), and black (K). As illustrated in FIG. 2, each of the image forming devices 10(Y, M, C, K) includes a rotary photoconductor drum 11 (an example of an image carrier). Around the photoconductor drum 11, the following devices (an example of a toner image forming unit) are disposed. That is, the devices include a charging device 12, an exposure device 13, a corresponding one of developing devices 14(Y, M, C, K), a corresponding one of primary transfer devices 15(Y, M, C, K) (an example of primary transfer units), and a corresponding one of drum cleaning devices 16(Y, M. C, K). The charging device 12 charges a circumferential surface (image carrying surface) of the photoconductor drum 11 on which an image may be formed to a required potential. The exposure device 13 irradiates the charged circumferential surface of the photoconductor drum 11 with light based on image information (signal) to form an electrostatic latent image (for a corresponding one of colors) having a potential difference. The developing devices 14(Y, M, C, K) develop the electrostatic latent images with toners that are developers of corresponding colors (Y, M, C, K) to form toner images. The primary transfer devices 15(Y, M, C, K) transfer the toner images to the intermediate transfer device 20. The drum cleaning devices 16(Y, M, C, K) clean the image carrying surface of the photoconductor drum 11 by removing adhering substances such as toners remaining on the image carrying surface of the photoconductor drum 11 after the primary transfer.

The photoconductor drum 11 includes a cylindrical or columnar base material to be grounded and the image carrying surface. The image carrying surface of the photoconductor drum 11 includes a photoconductive layer made of a photoconductive material and formed on the circumferential surface of the base material. The photoconductor drum 11 is supported to rotate in a direction indicated by an arrow A by power transmitted from a driving device (not illustrated).

The charging device 12 includes a contact type charging roller that is in contact with the photoconductor drum 11. A charging voltage is supplied to the charging device 12. As the charging voltage, a voltage or a current having the same polarity as a charging polarity of the toners is supplied from the developing devices 14 when the developing devices 14 perform reversal development. As the charging device 12, a non-contact type charging device such as a scorotron that is not in contact with the surface of the photoconductor drum 11 may be used.

The exposure device 13 deflects laser light LB and performs scan along the axial direction of the photoconductor drum 11. The laser light LB is generated in accordance with image information input to the image forming apparatus 1. The exposure device 13 may include an LED print head that forms electrostatic latent images by irradiating the photoconductor drum 11 with light corresponding to the image information by using light emitting diodes (LEDs) as plural light emitting elements arranged along the axial direction of the photoconductor drum 11.

Each of the developing devices 14(Y, M, C, K) includes, in a housing 140, a developing roller 141, agitation transport members 142 and 143 (such as two screw augers), and layer thickness restricting member (not illustrated). The housing 140 has an opening and a developer accommodating chamber. The developing roller 141 carries the developer and transports the developer to a developing region facing the photoconductor drum 11. The agitation transport members 142 and 143 agitate the developer and transport the developer to pass through the developing roller 141. The layer thickness regulating member regulates an amount (layer thickness) of the developer carried by the developing roller 141. In the developing device 14, a developing voltage is supplied between the developing roller 141 and the photoconductor drum 11 from a power supply device (not illustrated). The developing roller 141 and the agitation transport members 142 and 143 are rotated in a predetermined direction by power transmitted from the driving device (not illustrated). Further, a two-component developer containing a non-magnetic toner and a magnetic carrier is used as the developers for the four colors.

Each of the primary transfer devices 15(Y, M, C, K) is a contact type transfer device including a primary transfer roller. The primary transfer roller rotates in contact with the circumference of the photoconductor drum 11 via an intermediate transfer belt 21. A primary transfer voltage is supplied to the primary transfer roller. As the primary transfer voltage, a DC voltage having a polarity opposite to the charging polarity of the toner is supplied from the power supply device (not illustrated).

Each of the drum cleaning devices 16 includes a container-shaped body 160, a cleaning plate 161, and a delivery member 162 (such as a screw auger). A part of the body 160 is opened. The cleaning plate 161 is in contact with the circumferential surface of the photoconductor drum 11 after the primary transfer at a predetermined pressure and removes and cleans up the adhering substances such as the residual toner. The delivery member 162 collects the adhering substances such as the toner removed by the cleaning plate 161 and delivers the adhering substances to a collection system (not illustrated).

As illustrated in FIG. 1, the intermediate transfer device 20 is disposed at a position below the image forming devices 10(Y, M, C, K) in the vertical direction Z. The intermediate transfer device 20 includes the intermediate transfer belt 21, plural belt supporting rollers 22 to 26, a secondary transfer device 27, and a belt cleaning device 28. The intermediate transfer belt 21 rotates in a direction indicated by an arrow B while passing through the primary transfer positions between the photoconductor drum 11 and the primary transfer devices 15 (primary transfer rollers). The belt supporting rollers 22 to 26 rotatably support the intermediate transfer belt 21 while holding the intermediate transfer belt 21 in a desired state from an inner surface thereof. The secondary transfer device 27 (an example of a secondary transfer unit) is disposed on an outer peripheral surface (image carrying surface) of the intermediate transfer belt 21 supported by the belt supporting roller 26. The secondary transfer device 27 secondarily transfers the toner images on the intermediate transfer belt 21 to the recording sheet 5. The belt cleaning device 28 cleans the outer peripheral surface of the intermediate transfer belt 21 by removing the adhering substances such as the toner and paper dust remaining on the outer peripheral surface of the intermediate transfer belt 21 after passing through the secondary transfer device 27.

As the intermediate transfer belt 21, an endless belt made of a material in Which a resistance adjusting agent such as carbon black is dispersed in a synthetic resin such as a polyimide resin or a polyimide resin is used. The belt supporting roller 22 is a driving roller that is rotationally driven by a driving device (not illustrated). The belt supporting rollers 23 and 24 are face-up rollers that form an image formation surface of the intermediate transfer belt 21. The belt supporting roller 25 is a tension applying roller that applies tension to the intermediate transfer belt 21. The belt supporting roller 26 is a back surface supporting roller for secondary transfer. The belt supporting roller 22 also serves as an opposing roller opposing the belt cleaning device 28.

The secondary transfer device 27 is a contact type transfer device including a secondary transfer roller. The secondary transfer roller rotates in contact with the peripheral surface of the intermediate transfer belt 21 at the secondary transfer position that is an outer peripheral surface part of the intermediate transfer belt 21 supported by the belt supporting roller 26 in the intermediate transfer device 20. A secondary transfer voltage is supplied to the secondary transfer roller. As the secondary transfer voltage, a DC voltage having a polarity opposite to or the same as the charging polarity of the toner is supplied from a power supply device (not illustrated) to the secondary transfer device 27 or the belt supporting, roller 26 of the intermediate transfer device 20.

As illustrated in FIG. 1, the fixing device 40 includes, in a device housing 43 (see FIG. 3), a roller-shaped or belt-shaped heating rotary body 41 and a roller-shaped or belt-shaped pressurizing rotary body 42. The device housing 43 serves as a device body and has an inlet port and an outlet port for the recording sheet 5. The heating rotary body 41 rotates in a direction indicated by an arrow C. The heating rotary body 41 is heated by a heater such that a surface temperature thereof is maintained at a predetermined temperature. The pressurizing rotary body 42 is in contact with the heating rotary body 41 at a predetermined pressure and is driven to rotate in a state of extending substantially along an axial direction of the heating rotary body 41. In the fixing device 40, a contact portion where the heating rotary body 41 and the pressurizing rotary body 42 are in contact with each other serves as a fixing nip portion N where predetermined fixing processing (specifically, heating and pressurizing) is performed. The fixing device 40 integrally includes a decurling device 60. The decurling device 60 corrects curl of the recording sheet 5 subjected to the fixing processing by the heating rotary body 41 and the pressurizing rotary body 42. The configuration of the fixing device 40 will be described in detail later.

The sheet feeding device 30 is disposed at a position below the intermediate transfer device 20. The sheet feeding device 30 includes one or more sheet accommodating bodies 31 and delivery devices 32. The accommodating body 31 accommodates the recording sheets 5 of a desired size, type, and the like in a stacked state. The delivery device 32 delivers the recording sheets 5 one after one from the sheet accommodating body 31. The sheet accommodating body 31 is attached such that the sheet accommodating body 31 is configured to be pulled out to, for example, a front surface (in FIG. 1, a front side in the Y direction) of the apparatus body 1*a* that is a side surface that faces a user during operation.

Examples of the recording sheet 5 include thin sheets (such as plain sheets and tracing sheets), thick sheets, and OHP sheets for use in electrophotographic copiers and printers. To further improve the smoothness of the image surface after fixing, the surface of the recording sheet 5 may be as smooth as possible. For example, so-called thick sheets having a relatively large basis weight such as coated sheets obtained by coating the surfaces of plain sheets with a resin or the like, art sheets for printing, and the like may be used.

One or more pairs of sheet transport rollers 33 and 34 and a sheet feeding transport path 35 are disposed between the sheet feeding device 30 and the secondary transfer device 27. The pairs of sheet transport rollers 33 and 34 transport the recording sheet 5 delivered from the sheet feeding device 30 to the secondary transfer position. The sheet feeding transport path 35 includes a transport guide (not illustrated). The pair of sheet transport rollers 34 are disposed immediately before the secondary transfer position in the sheet feeding transport path 35. The sheet transport rollers 34 are, for example, rollers (registration rollers) that adjust a timing of transporting the recording sheet 5. A sheet transport path 37 is provided between the secondary transfer device 27 and the fixing device 40. The sheet transport path 37 includes a transport belt 36. The transport belt 36 transports the recording sheet 5 subjected to the secondary transfer and sent out from the secondary transfer device 27, to the fixing device 40. Further, an outlet transport path 39 is provided in a part close to a sheet outlet port of the apparatus body 1*a*. The outlet transport path 39 includes a pair of sheet outlet rollers 38 that discharges the fixed recording sheet 5 sent out from the fixing device 40 to a sheet outlet unit (not illustrated) provided on a side surface of the apparatus body 1*a*.

In the image forming apparatus 1 having the above configuration, the sheet feeding transport path 35 including the sheet transport roller pairs 33 and 34, the secondary transfer device 27, the sheet transport path 37 including the transport belt 36, and the fixing device 40 are integrally attached to constitute a sheet transport unit 300. The sheet transport unit 300 is configured to be drawn out to the front surface side with respect to the apparatus body 1*a* of the image forming apparatus 1 via a guide rail (not illustrated).

In the image forming apparatus 1, when a transport failure of the recording sheet 5 occurs in the sheet feeding transport path 35 including the pairs of sheet transport rollers 33 and 34, the secondary transfer device 27, the sheet transport path 37 including the transport belt 36, the fixing device 40, or the like, an operation of pulling out the sheet transport unit 300 from the apparatus body 1*a* to the front is performed.

In the image forming apparatus 1, when the sheet transport unit 300 is pulled out to the front, the sheet feeding transport path 35 including the pairs of sheet transport rollers 33 and 34, the secondary transfer device 27, the sheet transport path 37 including the transport belt 36, the fixing device 40, and the like are exposed to the outside, and the recording sheet 5 in which the transport failure has occurred can be removed.

In FIG. 1, a reference numeral 100 denotes a control device that comprehensively controls the operation of the image forming apparatus 1. The control device 100 includes a central processing unit (CPU), a read only memory (ROM), a random access memory (RAM), a bus that connects the CPU and the ROM, a communication interface, and the like, which are not illustrated.

Operation of Image Forming Apparatus

Hereinafter, a basic image forming operation performed by the image forming apparatus 1 will be described.

Here, an operation in a full-color mode for forming a full-color image that is a. combination of toner images of four colors (Y, M, C, K) using the four image forming devices 10(Y, M, C, K) will be described.

When the image forming apparatus 1 receives instruction information on a request for a full-color image forming operation (printing) from a user interface, a printer driver, or the like (not illustrated), the four image forming devices 10(Y, M, C, K), the intermediate transfer device 20, the secondary transfer device 27, the fixing device 40, and the like start operation.

In each of the image forming devices 10(Y, M, C, K), as illustrated in FIGS. 1 and 2, first, the photoconductor drum 11 rotates in the direction indicated by the arrow A. The charging device 12 charges the surface of the photoconductor drum 11 to a required polarity (negative polarity in the first exemplary embodiment) and a required potential. Subsequently, the exposure device 13 irradiates the charged surface of the photoconductor drum 11 with light emitted based on an image signal obtained by converting image information input to the image forming apparatus 1 into color components (Y, M, C, K), and forms an electrostatic latent image of each color component having a required potential difference on the surface of the photoconductor drum 11.

Subsequently, each of the image forming devices 10(Y, M, C. K) supplies a toner of a corresponding one of the colors (Y, M, C, K) charged to a required polarity (negative polarity) from the developing roller 141, and causes the toner to electrostatically adhere to the electrostatic latent image of the color component formed on the photoconductor drum 11, thereby performing development. By this development, the electrostatic latent images of the color components formed on the photoconductor drums 11 are visualized as toner images of the four colors (Y, M, C, K) developed with the toners of the corresponding colors.

Subsequently, when the toner images of the respective colors formed on the photoconductor drums 11 of the image forming devices 10(Y, M, C, K) are transported to the primary transfer positions, the primary transfer devices 15(Y, M, C, K) primarily transfer the toner images of the respective colors to the intermediate transfer belt 21 of the intermediate transfer device 20 rotating in the direction indicated by the arrow B such that the toner images of the respective colors are sequentially superimposed on each other.

In each of the image forming devices 10(Y, M, C, K) that has completed the primary transfer, the drum cleaning device 16 clean the surface of the photoconductor drum 11 by scraping off and removing the adhering substances. As a result, each of the image forming devices 10(Y, M, C, K) is ready to perform the next imaging operation.

Subsequently, the intermediate transfer device 20 carries and transports the toner images primarily transferred to the secondary transfer position as the intermediate transfer belt 21 rotates. Meanwhile, the sheet feeding device 30 feeds the required recording sheet 5 to the sheet feeding transport path 35 in accordance with the image forming operation. In the sheet feeding transport path 35, the pair of sheet transport rollers 34 (serving as the registration roller) feeds and supplies the recording sheet 5 to the secondary transfer position in accordance with a transfer timing.

At the secondary transfer position, the secondary transfer device 27 collectively secondarily transfers the toner images on the intermediate transfer belt 21 onto the recording sheet 5. In the intermediate transfer device 20 in which the secondary transfer has been completed, the belt cleaning device 28 cleans the front surface of the intermediate transfer belt 21 after the secondary transfer by removing the adhering substances such as the toner remaining on the surface of the intermediate transfer belt 21.

Subsequently, the recording sheet 5 onto which the toner images have been secondarily transferred is separated from the intermediate transfer belt 21 and then transported to the fixing device 40 via the sheet transport path 37. In the fixing device 40, the recording sheet 5 after the secondary transfer is introduced into and passes through the fixing nip portion N between the rotating heating rotary body 41 and the rotating pressurizing rotary body 42. Accordingly, necessary fixing processing (heating and pressurizing) is performed to fix unfixed toner images onto the recording sheet 5, and the decurling device 60 corrects curl of the recording sheet 5 generated by the fixing processing. Finally, the recording sheet 5 after the fixing is discharged to the sheet discharge unit (not illustrated) provided on the side surface of the apparatus body 1*a* by the pair of sheet outlet rollers 38.

By the above operation, the recording sheet 5 on which the full-color image which is the combination of the toner images of the four colors is formed is output.

Configuration of Fixing Device

Figure 3:
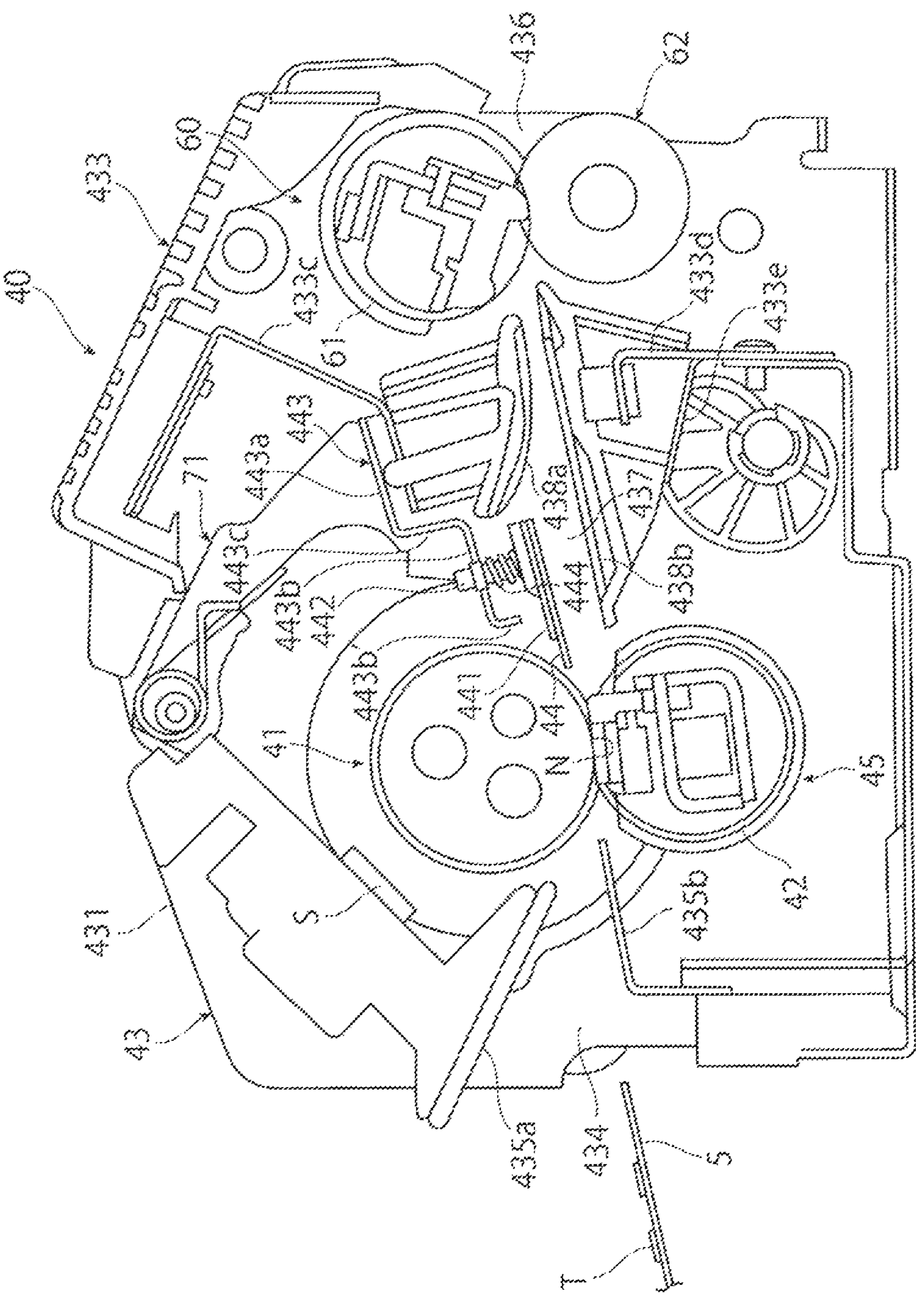
FIG. 3 is a cross-sectional view illustrating the fixing device according to the first exemplary embodiment of the present disclosure.

FIG. 3 is a cross-sectional view illustrating the fixing device to which the decurling device according to the first exemplary embodiment is applied. The fixing device 40 integrally includes the decurling device (decurler) 60.

As illustrated in FIG. 3, the fixing device 40 roughly includes the device housing 43, the heating roller 41, a pressurizing belt 42, a peeling claw 44, a decurling belt 61, and a decurling roller 62. The device housing 43 is an example of a device body of the fixing device 40. The heating roller 41 and the pressurizing belt 42 are provided inside the device housing 43. The heating roller 41, which is the heating rotary body, and the pressurizing belt 42, which is the pressurizing rotary body, are an example of a fixing unit. The heating roller 41 and the pressurizing belt 42 perform the fixing processing on the recording sheet 5. The peeling claw 44 is integrally provided inside the device housing 43. The peeling claw is an example of a peeling assisting unit that assists peeling of the recording sheet 5 from the heating roller 41. The decurling belt 61 and the decurling roller 62 are integrally provided inside the device housing 43. The decurling belt 61 is an example of a first decurling rotary body, and the decurling roller 62 is an example of a second decurling rotary body. The decurling belt 61 and the decurling roller 62, which are an example of a pair of decurling unit, correct curl of the recording sheet 5 by sandwiching the recording sheet 5 therebetween.

The heating rotary body is not limited to the heating roller 41. An endless belt may be used as the heating rotary body.

The pressurizing rotary body is not limited to the pressurizing belt 42. A roller-shaped rotary body may be used as the pressurizing rotary body.

The first decurling rotary body is not limited to the decurling belt 61, but may be one having a roller shape. The second decurling rotary body is not limited to the decurling roller 62, but may be an endless belt.

Figure 4:
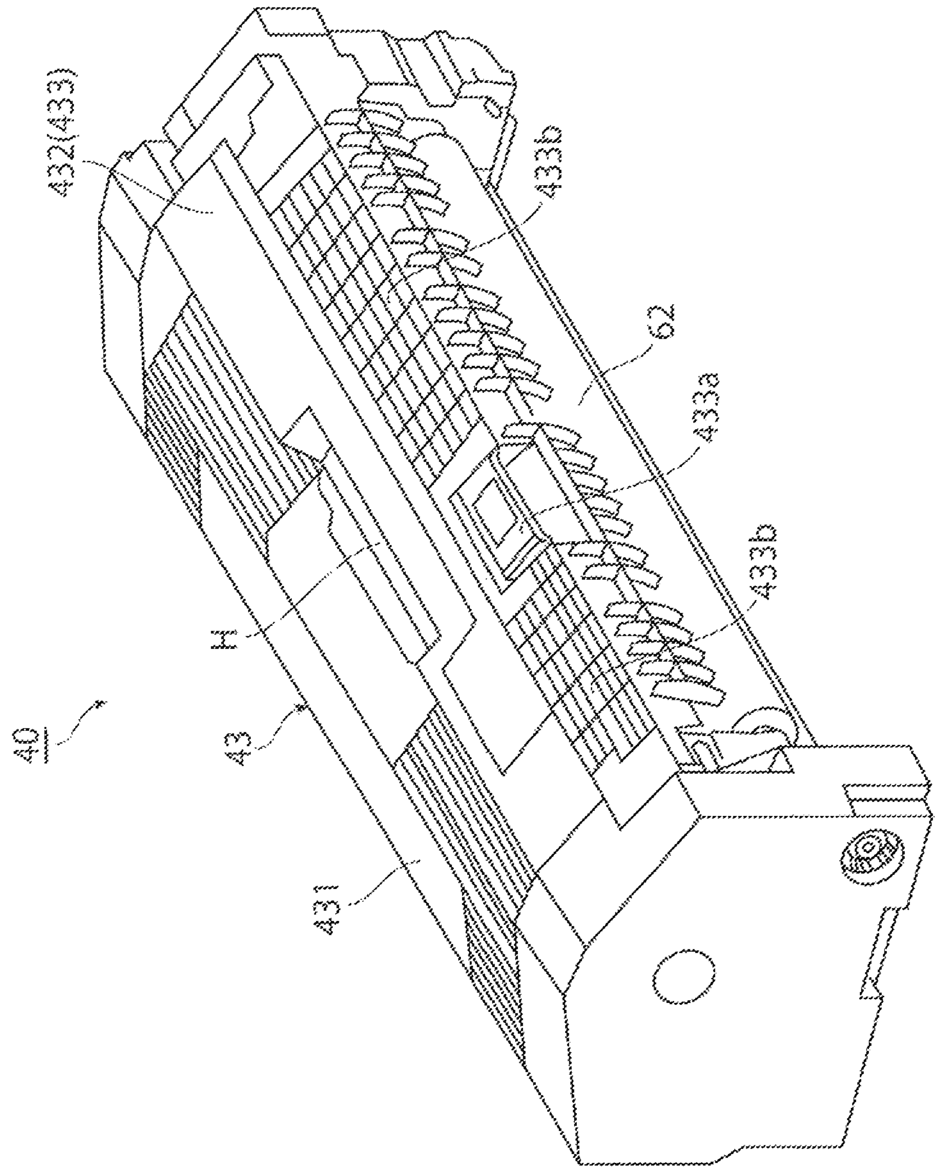
FIG. 4 is a perspective configuration diagram illustrating a device housing of the fixing device according to the first exemplary embodiment of the present disclosure.

As illustrated in FIG. 4, the device housing 43 is formed in an elongated box shape having a substantially pentagonal side surface. The device housing 43 includes plural frames made of a sheet metal or the like and an exterior member made of a synthetic resin or the like. The exterior member covers outer peripheries of the plural frames.

The device housing 43 includes, on an upper end surface thereof, a first inclined surface portion 431 and a second inclined surface portion 432. The first inclined surface portion 431 is disposed upstream in the transport direction of the recording sheet 5. The first inclined surface portion 431 is inclined with a downstream end portion in the transport direction of the recording sheet 5 being located on an upper side in the vertical direction. The second inclined surface portion 432 is disposed downstream in the transport direction of the recording sheet 5. The second inclined surface portion 432 is inclined with a downstream end portion in the transport direction of the recording sheet 5 being located on a lower side in the vertical direction. The second inclined surface portion 432 of the device housing 43 constitutes an opening and closing cover 433 that is an example of an opening and closing unit. The opening and closing cover 433 is openable and closable with respect to the device housing 43. An operation handle 433*a* is rotatably attached to the opening and closing cover 433 via a rotation shaft 725 on a front side in the longitudinal direction. The operation handle 433*a* is operated when opening and closing the opening and closing cover 433. The rotation shaft 725 will be described later. The opening and closing cover 433 is provided with a ;rid-patterned exhaust port 433*b* that exhausts upward air sent from below as necessary in order to cool the decurling device 60. A reference sign "H" denotes a grip portion provided at a center of the upper end surface of the device housing 43. The operator grips the fixing device 40 using the grip portion.

As illustrated in FIG. 3, the device housing 43 has an inlet port 434 on a left side surface thereof. The recording sheet 5 having unfixed toner images T transferred thereto is introduced into the device housing 43 through the inlet port 434. An upper guide 435*a* and a lower guide 435*b* are disposed inside the inlet port 434 and guide the recording sheet 5 to the fixing nip portion N where the heating roller 41 and the pressurizing belt 42 are in pressure contact with each other. The device housing 43 has an outlet port 436 on the right side surface thereof. The recording sheet 5 whose curl has been corrected by the decurling belt 61 and the decurling roller 62 is discharged to the outside through the outlet port 436. Inside the device housing 43, a transport path 437 of the recording sheet 5 is formed. The transport path 437 is inclined such that a downstream side of the transport path 437 in the transport direction of the recording sheet 5 from the inlet port 434 toward the outlet port 436 is located on an upper side in the vertical direction. Inside the device housing 43. an upper chute 438*a* and a lower chute 438*b* are disposed between (i) the heating roller 41 and the pressurizing belt 42 and (ii) the decurling belt 61 and the decurling roller 62. The upper chute 438*a* and the lower chute 438*b* guide both a front surface and a back surface of the recording sheet 5. The upper chute 438*a* is attached to the opening and closing cover 433 via an attachment frame 433*c* fixed to the inner surface of the opening and closing cover 433 so as to be openable and closable together with the opening and closing cover 433. The lower chute 438*b* is attached via attachment frames 433*d* and 433*e* fixed to the inside of the device housing 43. The recording sheet 5 is transported using, as a reference, a center in a direction extending along the front surface that is the width direction intersecting the transport direction (so-called center registration). In FIG. 3, a reference sign "S" denotes a non-contact temperature sensor that detects the surface temperature of the heating roller 41.

Figure 5:
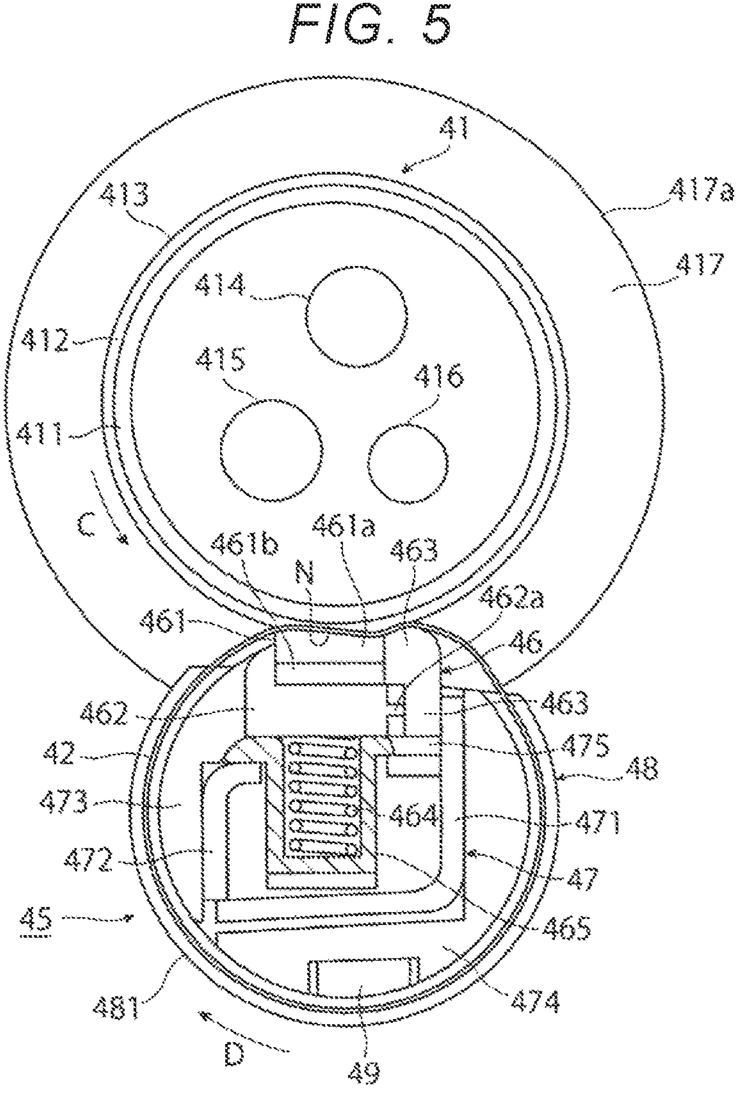
FIG. 5 is a cross-sectional view illustrating a part of the fixing device according to the first exemplary embodiment of the present disclosure.

As illustrated in FIG. 5. the heating roller 41 includes a cylindrical core 411, an elastic body layer 412, and a release layer 413. The cylindrical core 411 is made of a metal such as stainless steel, aluminum, or iron (thin high-tensile steel pipe). The elastic body layer 412 covers an outer periphery of the core 411. The elastic body layer 412 made of a heat resistant elastic body such as silicone rubber or fluororubber. The release layer 413 is thinly coated on the front surface of elastic body layer 412. The release layer 413 is made of perfluoroalkoxy alkane (PFA), polytetrafluoroethylene (PTFE), or the like. Plural halogen lamps 414 to 416 (three halogen lamps in the illustrated example) are disposed inside the heating roller 41. The halogen lamps 414 to 416 are an example of a heating source. The three halogen lamps 414 to 416 are turned on individually or in group simultaneously according to the size and type of the recording sheet 5. Both end portions of the core 411 of the heating roller 41 in the axial direction are rotatably supported via a bearing 417 (an example of a bearing member) attached to a frame of the device housing 43. The bearing 417 has an outer peripheral surface 417*a* formed in a cylindrical shape. The outer peripheral surface 417*a* is formed of an outer cylinder made of a metal such as stainless steel.

The heating roller 41 is rotationally driven at a required speed in the direction of the arrow C by a driving device (not illustrated) via a driving gear. The driving gear is not illustrated, and includes a helical gear or the like attached to an end portion of the core 411 on a back surface side in the axial direction. Plural rotation speeds of the heating roller 41 may be se according to the type of the recording sheet 5 or the like.

As illustrated in FIG. 3, the peeling claw 44 is disposed on the outer peripheral surface of the heating roller 41. The peeling claw 44 prevents the recording sheet 5 from winding around the outer peripheral surface of the heating roller 41 and assists peeling of the recording sheet 5 from the surface of the heating roller 41. At the exit of the fixing nip portion N, the tip of the peeling claw 44 faces the surface of the heating roller 41 with a predetermined minute gap therebetween. The peeling claw 44 is inclined at a required angle relative to the outer peripheral surface of the heating roller 41. The peeling claw 44 is formed of an elongated rectangular thin metal plate or the like disposed over substantially an entire length in the axial direction of the heating roller 41.

The peeling claw 44 is attached to a lower surface of a flat plate-shaped holding member 441 made of a heat-resistant synthetic resin or the like by adhesion, screwing, or the like. Plural attachment portions 442 having a columnar shape protrude from an upper end surface of the holding member 441. The plural attachment portions 442 are arranged at predetermined intervals along a longitudinal direction. An attachment member 443 made of a sheet metal or the like is disposed above the holding member 441. The attachment member 443 attaches the peeling claw 44 to the opening and closing cover 433. The attachment member 443 is formed in a crank shape in a cross section. The attachment member 443 includes an upper horizontal plate portion 443*a*, a lower horizontal plate portion 443*b*, and a short vertical plate portion 443*c* connecting the upper horizontal plate portion 443*a* and the lower horizontal plate portion 443*b*. The upper horizontal plate portion 443*a* and the lower horizontal plate portion 443*b* are different in height to form a step. A tip 443*b*' of the lower horizontal plate portion 443*b* of the attachment member 443 is bent downward by a short distance. The plural attachment portions 442 of the holding member 441 are inserted into the lower horizontal plate portion 443*b* of the attachment member 443 in a retained state. As a result, the holding member 441 is attached so as to be movable upward with respect to the attachment member 443. A coil spring 444 is interposed between the lower horizontal plate portion 443*b* of the attachment member 443 and the holding member 441. The coil spring 444 enables the peeling claw 44 to move (retract) upward.

Figure 8:
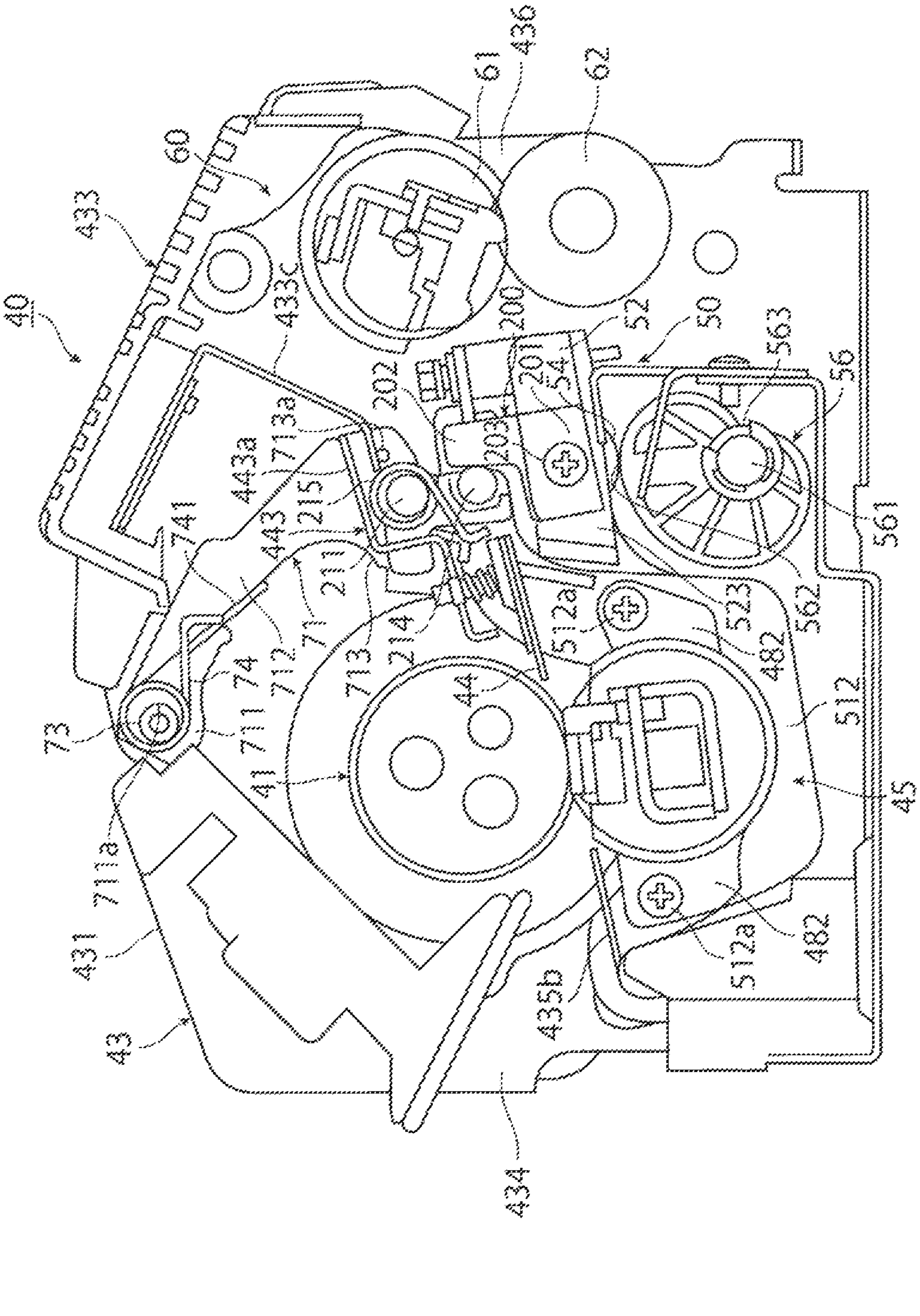
FIG. 8 is a cross-sectional view illustrating the fixing device according to the first exemplary embodiment of the present disclosure

Both end portions of the attachment member 443 in the longitudinal direction of the attachment member 443 to which the peeling claw 44 is attached are fixed to first support arms 71, As illustrated in FIG. 8, the first support arms 71 are respectively disposed at both end portions of the attachment member 443 in the longitudinal direction. The first support arms 71 are attached to the device housing 43 to be rotatable about support shafts 73. The support shafts 73 are provided at an upper end portion of the device housing 43. The support shafts 73 protrude inward from inner surfaces of internal frames located at both end portions in the longitudinal direction of the device housing 43.

As illustrated in FIG. 8, each of the first support arms 71 is made of a sheet metal or the like which has a side surface formed in a substantially L-shape and which has a predetermined thickness. The first support arm 71 includes a base end portion 711, an intermediate portion 712, and a tip portion 713. The base end portion 711 is rotatably supported by the support shaft 73 through a circular support hole 711*a*. The intermediate portion 712 extends obliquely downward from the base end portion 711. The tip portion 713 is formed at a lower end portion of the intermediate portion 712 to protrude toward the heating roller 41. A tip portion 741 of a spring 74 wound around the support shaft 73 is locked to the intermediate portion 712 of the first support arm 71. The first support arm 71 is biased by the spring 74 to rotate in a counterclockwise direction. The upper horizontal plate portion 443*a* of the attachment member 443 is attached to the tip portion 713 of the first support arm 71.

Figure 9:
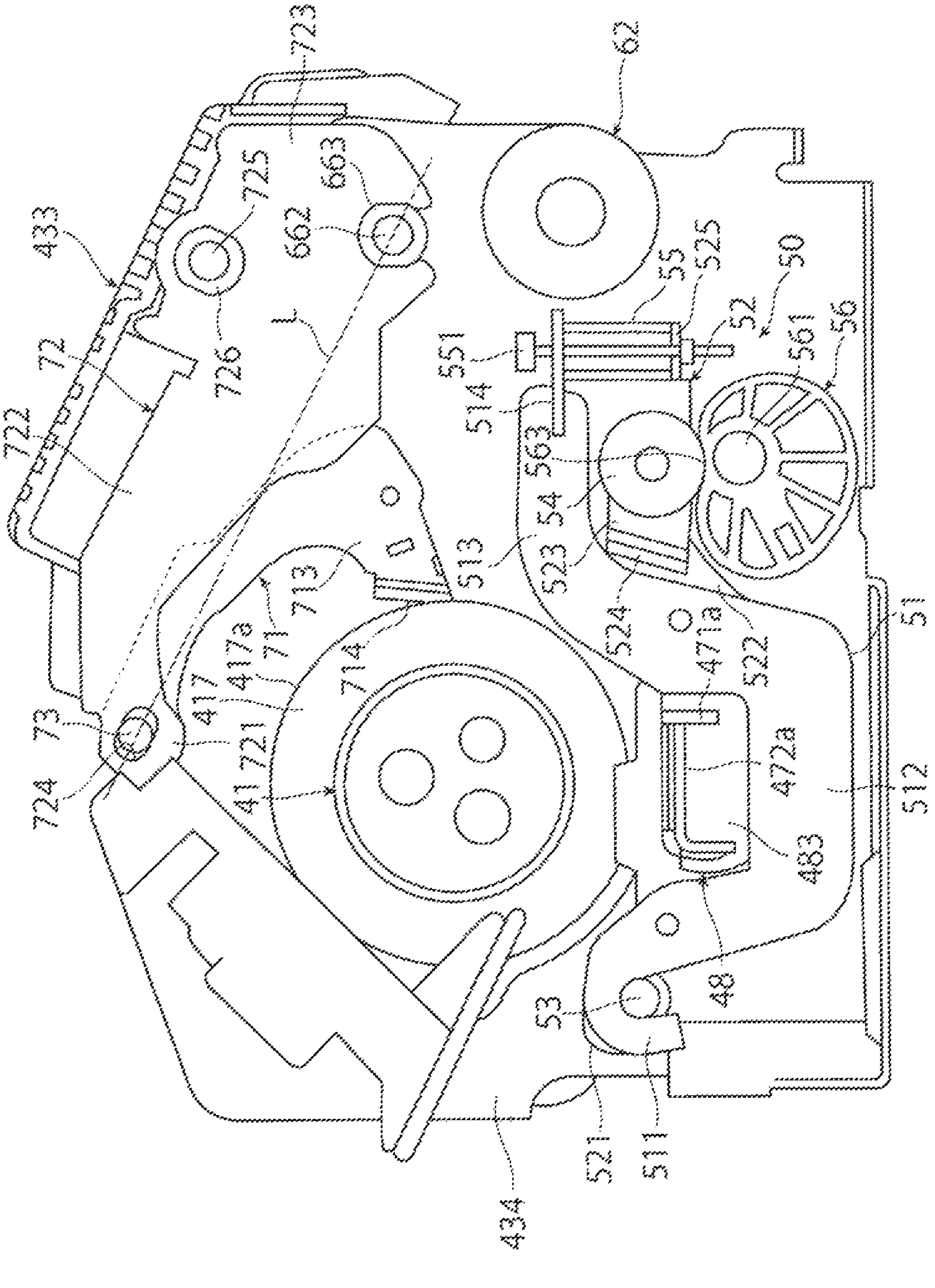
FIG. 9 is a cross-sectional view illustrating the fixing device according to the first exemplary embodiment of the present disclosure.

As illustrated in FIG. 9, the tip portion 713 of the first support arm 71 includes a first positioning portion 714. The first positioning portion 714 positions the heating roller 41 by abutting against the outer peripheral surface of the bearing 417 that rotatably supports the heating roller 41. The first positioning portion 714 is formed by bending the tip portion 713 of the first support arm 71 outward in the axial direction of the heating roller 41 in a substantially L-shape.

When the opening and closing cover 433 is closed, the first positioning portion 714 comes into contact with (abuts against) the outer peripheral surface 417*a* of the bearing 417, so that the first support arm 71 is stopped and positioned. Both end portions of the heating roller 41 in the axial direction are rotatably supported by the bearings 417. Therefore, by positioning the first support arm 71 with the bearing 417, the peeling claw 44 that assists the peeling of the recording sheet 5 from the surface of the heating roller 41 is positioned. accurately at a position where the peeling claw 44 faces the outer peripheral surface of the heating roller 41 via a predetermined minute gap at a predetermined angle.

As illustrated in FIG. 8, when the opening and closing cover 433 is closed, a pin 713*a* provided at the tip portion 713 of the first support arm 71 is in contact with a lower end portion of the attachment frame 433*c* fixed to the inner surface of the opening and closing cover 433. The first support arm 71 rotates in the opening and closing direction around the support shaft 73 separately from the opening and closing cover 433. However, when the pin 713*a* provided at the tip portion 713 of the first support arm 71 abuts against the lower end. portion of the attachment frame 433*c* of the opening and closing cover 433, the first support arm 71 is consequently rotated in the opening and closing direction together with the opening and closing cover 433.

As illustrated in FIG. 3, the pressurizing belt 42 constitutes a pressurizing unit 45 integrally assembled to hold the pressurizing belt 42 and bring the pressurizing belt 42 into pressure contact with the heating roller 41.

As illustrated in FIGS. 5, the pressurizing unit 45 includes the pressurizing belt 42, a pressurizing member 46 (an example of a pressurizing unit), a support member 47 (an example of a support unit), a guide member 48 (an example of a guide unit), and a felt 49 (an example of a lubricant holding unit). The pressurizing member 46 is disposed inside the pressure belt 42 and brings the pressure belt 42 into pressure contact with the surface of the heating roller 41. The support member 47 is disposed inside the pressurizing belt 42 and supports the pressurizing member 46. The guide member 48 rotatably guides both end portions of the pressurizing belt 42 in the longitudinal direction. The felt 49 is disposed inside the pressurizing belt 42 and holds a lubricant applied to the inner peripheral surface of the pressurizing belt 42.

Figure 6:
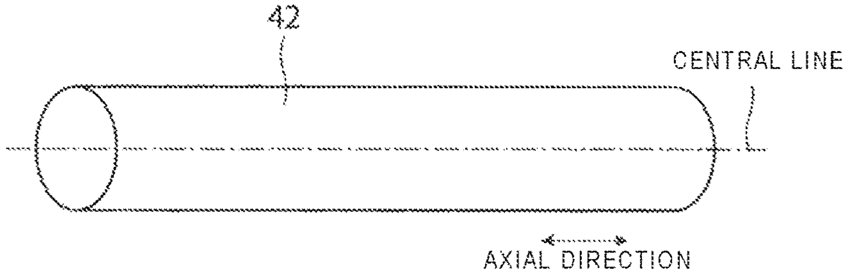
FIG. 6 is a perspective view illustrating a pressurizing belt.
Figure 7:
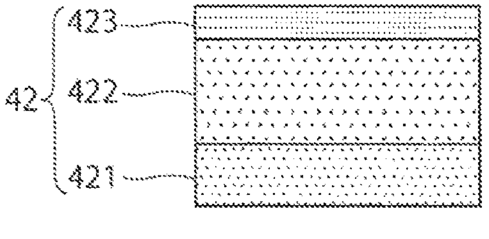
FIG. 7 is a cross-sectional view illustrating the pressurizing belt.

As illustrated in FIG. 6, the pressurizing belt 42 is made of a material having flexibility and is an endless belt. The pressurizing belt 42 before attached to the pressurizing unit 45 has a thin cylindrical shape. As illustrated in FIG. 7, the pressurizing belt 42 includes a base material layer 421, an elastic body layer 422 covering a front surface of the base material layer 421, and a release layer 423 covering a front surface of the elastic body layer 422. The pressurizing belt 42 may include the base material layer 421 and the release layer 423 covering the front surface of the base layer 421. The base material layer 421 is thrilled of a heat resistant synthetic resin such as polyimide, polyamide, or polyimideamide. The elastic body layer 422 is made of a heat resistant elastic body such as silicone rubber or fluororubber. The release layer 423 is made of perfluoroalkoxy alkane (PEA), polytetrafluoroethylene (PTFE), or the like. The pressurizing belt 42 may have a thickness of for example, about 50 μm or more and about 200 μm or less.

The pressurizing belt 42 is driven to rotate in a direction of an arrow D by being brought into pressure contact with the heating roller 41.

As illustrated in FIG. 5, the pressurizing member 46 is a member that brings the pressurizing belt 42 into pressure contact with the heating roller 41. The pressurizing member 46 includes a pad member 461, a pad support member 462, and a pressurizing member 463. The pad member 461 comes into contact with the inner peripheral surface of the pressurizing belt 42 to bring the pressurizing belt 42 into pressure contact with the heating roller 41. The pad support member 462 supports the pad member 461. The pressurizing member 463 presses the pressurizing belt 42 toward the heating roller 41 at the exit portion of the fixing nip portion N, deforms the elastic body layer 412 of the heating roller 41 into a concave shape, and separates the recording sheet 5 from the surface of the heating roller 41 by the rigidity of the recording sheet 5 itself The pad member 461 includes a first pad member 461*a* and a second pad member 461*b*. The first pad member 461*a* includes a foam body made of silicone rubber or acrylonitrile rubber that forms the fixing nip portion N. The first pad member 461*a* has a substantially rectangular shape in cross section. The second pad member 461*b* includes a metal pedestal that supports the first pad member 461*a*. The first pad member 461*a* is fixed to the second pad member 461*b* by adhesion or the like.

The pad support member 462 includes a heat resistant synthetic resin or the like and has a substantially L-shape in cross section. The pad support member 462 has a projection portion 462*a* that holds the pressing member 463 on a downstream end surface thereof in the rotational direction of the pressurizing belt 42. The pad support member 462 is elastically supported by plural (for example, ten) coil springs 464 arranged in the longitudinal direction of the pressurizing belt 42. The coil spring 464 is supported by a support cylinder 465 attached to the support member 47.

The pressing member 463 is made of a heat resistant synthetic resin or the like and has a substantially reverse L-shape in cross section. The pressing member 463 is supported by a short flat plate-shaped support plate 475 in a state where the pressing member 463 is held between the projection portion 462*a* of the pad support member 462 and the support member 47. A lower end portion of the support plate 475 is fixed to the support member 47 by welding, crimping, or the like.

As illustrated in FIG. 5, the support member 47 is a member that supports the pressurizing member 46, which is brought into pressure contact with the heating roller 41 via the pressurizing belt 42. The configuration of the support member 47 is not limited to the above example. The support member 47 has any configuration if the support member 47 has rigidity capable of reacting against a reaction force from the heating roller 41. The support member 47 according to the first exemplary embodiment includes first and second support members 471 and 472 that are two sheet metals having a substantially L-shape in cross section. The first and second support member 471 and 472 are combined and fixed so as to have a substantially rectangular shape in a cross section, Both end portions 471*a* and 472*a* of the first and second support members 471 and 472 in the longitudinal direction thereof are fitted to the guide member 48 to be fixed (see FIG. 9). Holding members 473 and 474 that rotatably hold the inner peripheral surface of the pressurizing belt 42 are attached to the first and second support members 471 and 472. The support cylinder 465 that supports the coil springs 464 is provided integrally with the holding member 473, for example.

The guide members 48 are disposed at both end portions, in the axial direction, of the pressurizing belt 42. The guide member 48 is integrally formed of a heat-resistant synthetic resin or the like. As illustrated in FIG. 5, the guide member 48 includes a flange portion 481, a guide portion (not illustrated), attachment portions 482 (see FIG. 8), and a fixing portion 483 (see FIG. 9). The flange portion 481 is formed in a substantially plate shape and has an outer diameter larger than an outer diameter of the pressurizing belt 42. The guide portion is formed in a short cylindrical shape on an inner side surface of the flange portion 481 and rotatable guides an end portion of the pressurizing belt 42. The attachment portions 482 protrude from left and right sides of the flange portion 481, respectively. The fixing portion 483 has a substantially rectangular side surface on an outer side surface of the flange portion 481.

As illustrated in FIGS. 8 and 9, the attachment portions 482 of the guide member 48 are fixed to a pressurizing arm 51 with screws 512*a* in a state where the fixing portion 483 having the rectangular side surface is fixed to an intermediate portion 512 of the pressurizing arm 51.

As illustrated in FIG. 5, the felt 49 is formed in an elongated rectangular shape in a cross section over the substantially entire length of the pressurizing belt 42. The felt 49 is provided in a recess portion on the lower end surface of the holding member 474 by adhesion or the like. The felt 49 is impregnated with a predetermined amount of lubricant to be supplied in a state of being applied to the inner peripheral surface of the pressurizing belt 42. The lubricant reduces a sliding resistance between the pressurizing belt 42 and the pressurizing member 46, As the lubricant, for example, an amino-modified silicone oil having a viscosity of 100 cs or more and 350 cs or less is used. The felt 49 is impregnated with the lubricant in advance, and the lubricant is applied and supplied to the inner peripheral surface of the pressurizing belt 42. It is noted that the present disclosure is not limited thereto. Alternatively, the lubricant may be supplied in a state of being applied to the inner peripheral surface of the pressurizing belt 42 initially.

As illustrated in FIGS. 8 and 9, the pressurizing unit 45 is movable in a direction in which the pressure unit 45 comes into contact with or separates from the heating roller 41 by a retraction mechanism 50 (an example of a contact and separation unit). The retraction mechanism 50 includes the pressurizing arms 51 and action arms 52. The pressurizing arms 51 are rotatable about a support shaft 53 (an example of a fulcrum). The pressurizing unit 45 is attached to the pressurizing arms 51. The action arms 52 are also rotatable about the support shaft 53 and apply a pressing force to the pressurizing arms 51. The pressurizing arms 51 are disposed at both end portions of the pressurizing belt 42 in the axial direction.

The action arms 52 are disposed on the inner side of the pressurizing arms 51 in the axial direction of the pressurizing belt 42 to be adjacent to the pressurizing arms 51, respectively.

The pressurizing arm 51 includes a flat plate shaped sheet metal or the like having a predetermined thickness. The pressurizing arm 51 includes a base end portion 511, the intermediate portion 512, and a tip portion 513. The base end portion 511 has a substantially inverted U-shape. At the inlet port 434 of the device housing 43, the base end portion 511 is rotatably supported by the support shaft 53 disposed at a base end portion of the lower guide member 435*b*. A side surface of the intermediate portion 512 is formed in a substantially U shape. The intermediate portion 512 holds the pressurizing unit 45. The tip portion 513 extends in a substantially horizontal direction from a right upper end portion of the intermediate portion 512.

As illustrated in FIG. 8, the right and left attachment portions 482 of the guide member 48 constituting the pressurizing unit 45 are fixed to the intermediate portion 512 of the pressurizing arm 51 with the screws 512*a*. When the pressurizing unit 45 moves upward together with the pressurizing arms 51, the pressurizing belt 42 is pressed against the surface of the heating roller 41 with a required pressing force via the support member 47 and the pressurizing member 46.

The action arm 52 is formed in a shape substantially similar to that of the pressurizing arm 51. The action arm 52 includes a base end portion 521, an intermediate portion 522, and a tip portion 523. The base end portion 521 is rotatably supported by the support shaft 53. A side surface of the intermediate portion 522 is formed in a substantially U shape. The tip portion 523 extends in the substantially horizontal direction from a right upper end portion of the intermediate portion 522.

As illustrated in FIG. 9, the tip portion 523 of the action arm 52 is located below the tip portion 513 of the pressurizing arm 51 via a bent portion 524. The tip portion 523 of the action arm 52 is bifurcated to be parallel to the tip portion 513 of the pressurizing arm 51. A disk-shaped cam follower 54 is rotatably attached between the bifurcated tip portions 523 of the action arm 52.

A pressurizing spring 55 is interposed between the tip portion 513 of the pressurizing arm 51 and the tip portion 523 of the action arm 52. The pressurizing spring 55 applies a pressing force to the pressurizing arm 51. A support plate 514 is provided at the tip portion 513 of the pressurizing arm 51 by welding or the like. The support plate 514 supports an upper end portion of the pressurizing spring 55. A support plate portion 525 is bent in a substantially U-shape in a cross section so as to be integrally provided at the tip portion 523 of the action arm 52. The support plate portion 525 supports a lower end portion of the pressurizing spring 55. An adjustment bolt 551 is attached between the support plate 514 of the pressurizing arm 51 and the support plate portion 525 of the action arm 52. The adjustment bolt 551 adjusts the pressing force of the pressurizing spring 55.

A first eccentric cam 56 is rotatably disposed below the cam follower 54 of the action arm 52. A rotation shaft 561 can rotate the first eccentric cam 56. The first eccentric cam 56 includes a pressurizing portion 562 having the largest radius and a pressurizing release portion 563 having the smallest radius. The first eccentric cam 56 has an eccentric substantially oval shape which is formed by connecting the pressurizing portion 562 and the pressurizing releasing portion 563 with a smooth curved surface. The rotation shaft 561 of the first eccentric cam 56 is rotationally driven in a clockwise direction and a counterclockwise direction by a driving motor (not illustrated) disposed on the back surface side of the device housing 43, so that the pressurizing belt 42 is brought into pressure contact with the heating roller 41 with a required pressing force, and the pressurizing belt 42 may be switched to a pressure contact released state (see FIG. 9) in which the pressurizing belt 42 is separated from the heating roller 41. When the pressurizing release portion 563 of the first eccentric cam 56 rotates to a position where the pressurizing release portion 563 faces the cam follower 54, the pressurizing arm 51 retracts to a lower pressurizing released position by its own weight together with the action arm 52. At the pressurizing released position, a pressurized state between the pressurizing belt 42 and the heating roller 41 may only have to be released, and the pressure belt 42 may not be separated from the surface of the heating roller 41.

The fixing device 40 having the above configuration fixes the unfixed toner images T onto the recording sheet 5 passing through the fixing nip portion N by heating and pressurizing the recording sheet 5 with the heating roller 41 and the pressurizing belt 42. When the recording sheet 5 on which the unfixed toner images T are to be fixed passes through the fixing nip portion N, the recording sheet 5 is curved due to various factors such as a material of the recording sheet 5. an area of the unfixed toner images T to be fixed on the recording sheet 5, and a thickness of a toner layer. In the fixing device 40, for example, when the recording sheet 5 such as a thick sheet passes through the fixing nip portion N, the recording sheet 5 may be curved in a downward convex shape. In the fixing device 40, for example, when the recording sheet 5 such as a plain sheet or a thin sheet such as tracing sheet passes through the fixing nip portion N, the recording sheet 5 may be curved in an upward convex shape.

Figure 10:
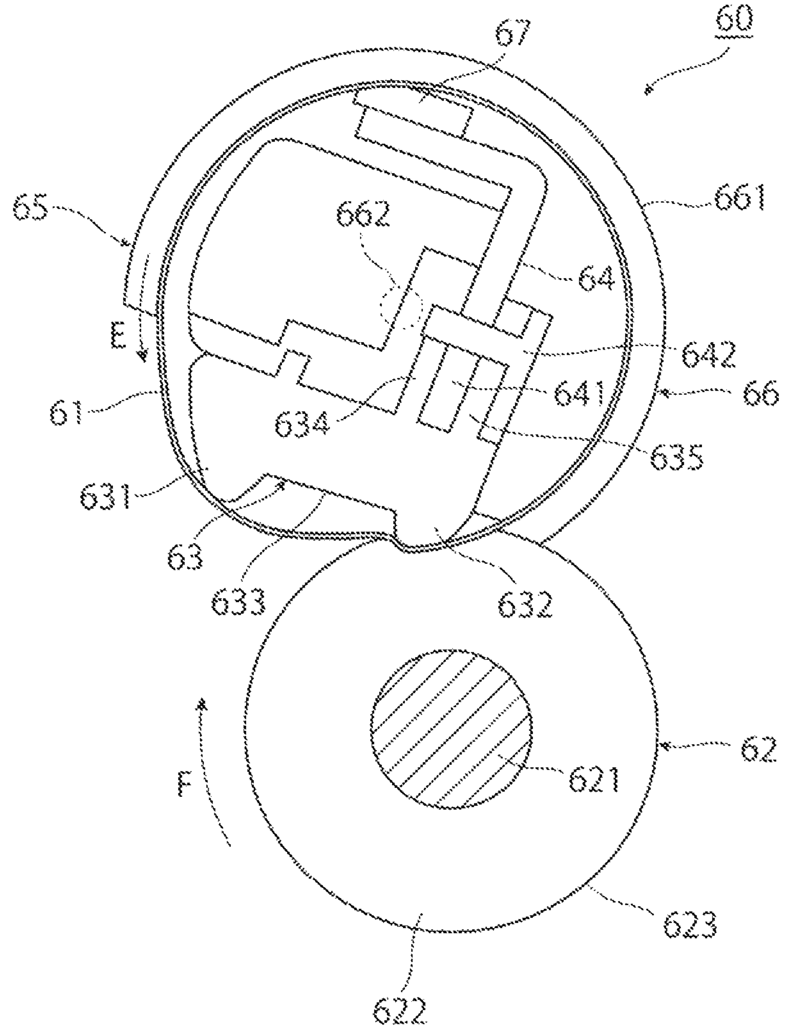
FIG. 10 is a cross-sectional view illustrating a decurling device.

As illustrated in FIG. 10, the decurling device 60 includes the decurling belt 61 and the decurling roller 62. The decurling belt 61 comes into contact with a front surface of the recording sheet 5 (that is, a surface of the recording medium 5 on which the toner image has been formed) to correct curl of the recording sheet 5. The decurling roller 62 comes into contact with a back surface of the recording sheet 5 to correct the curl of the recording sheet 5. The decurling device 60 corrects the cud of the recording sheet 5 using the decurling belt 61 and the decurling roller 62 in both cases where the recording sheet 5 is curved in a direction in which the recording sheet 5 is convex downward and where the recording sheet 5 is curved in a direction in which the recording sheet 5 is convex upward. The decurling belt 61 and the decurling roller 62 are a pair of decurling units.

The decurling belt 61 is an endless belt that corrects curl of the recording sheet 5 by passing the recording sheet 5 between the decurling belt 61 and the decurling roller 62. A pressure contact member 63 (an example of a pressure contact unit) is disposed inside the decurling belt 61. An opposite surface of the pressure contact member 63 to the decurling roller 62 is supported by a support frame 64 (an example of a support unit) having rigidity. The pressure contact member 63 is in pressure contact with the decurling roller 62.

The decurling belt 61 constitutes a correction belt unit 65 including the pressure contact member 63, the support frame 64, and the like disposed inside the decurling belt 61. The correction belt unit 65 includes the decurling belt 61, the pressure contact member 63, the support frame 64, a pair of guide members 66 (an example of a guide unit), and a felt 67 (an example of a lubricant holding unit). The pressure contact member 63 is disposed inside the decoding belt 61. The pressure contact member 63 brings the decurling belt 61 into pressure contact with the surface of the decurling roller 62. The support frame 64 supports the pressure contact member 63. The pair of guide members 66 rotatably guides both end portions of the decurling belt 61 in a longitudinal direction of the decurling belt 61. The felt 67 is disposed inside the decurling belt 61. The felt 67 holds the lubricant to be applied to an inner peripheral surface of the decurling belt 61.

Figure 11:
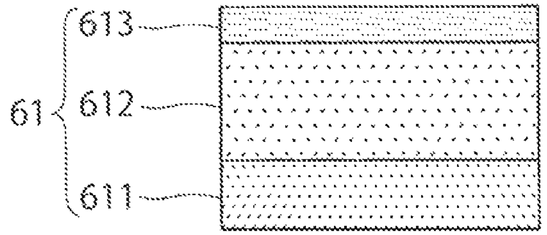
FIG. 11 is a cross-sectional view illustrating a decurling belt.

Similarly to the pressurizing belt 42 described above, the decurling belt 61 is made of a material having flexibility and is an endless belt. The decurling belt 61 has a thin cylindrical shape before attached to the decurling device 60. As illustrated in FIG. 11, the decurling belt 61 includes a base material layer 611, an elastic body layer 612 covering a surface of the base material layer 611, and a release layer 613 covering a surface of the elastic body layer 612. The decurling belt 61 may include the base material layer 611 and the release layer 613 covering the surface of the base material layer 611. The base material layer 611 is made of a heat resistant synthetic resin, such as polyimide, polyamide, or polyimideamide. The elastic body layer 612 is made of a heat resistant elastic body such as silicone rubber or fluororubber. The release layer 613 is made of perfluoroalkoxy alkane (PEA), polytetrafluoroethylene (PTFE), or the like. The decurling belt 61 may have a thickness of, fir example, about 50 μm or more and about 200 μm or less.

The decurling belt 61 is brought into pressure contact with the decurling roller 62 to be driven to rotate in a direction indicated by an arrow E.

As illustrated in FIG. 10, the pressure contact member 63 is formed in a thick flat plate shape and is made of a heat resistant synthetic resin or the like. The pressure contact member 63 includes, on a lower end surface thereof, a first projection portion 631, a second projection portion 632, and a flat surface portion 633. The first projection portion 631 is disposed on the upstream side in the transport direction of the recording sheet 5 and has a curved downward mountain shape. The second projection portion 632 is disposed on the downstream side in the transport direction of the recording sheet 5 and has a curved downward mountain shape. The flat surface portion 633 is flat between the first projection portion 631 and the second projection portion 632. An amount by which the second projection portion 632 protrudes is equal to or larger than that by which the first projection portion 631 protrudes.

The pressure contact member 63 has, on a back surface thereof, a pair of attachment plate portions 634 and 635 standing upward. The support frame 64 is attached to the back surface of the pressure contact member 63 by the pair of attachment plate portions 634 and 635 with fixed to a downstream end portion of the pressure contact member 63 in the transport direction of the recording sheet 5.

The support frame 64 includes a sheet metal or the like having a predetermined thickness and bent into a substantially L-shape in a cross section. A lower end portion 641 of the support frame 64 is fixed by screws 642 in a state of being sandwiched between the attachment plate portions 634 and 635 of the pressure contact member 63.

The guide members 66 are attached with fixed to both end portions of the support frame 64 in the longitudinal direction. The guide member 66 is integrally formed of a heat-resistant synthetic resin or the like. As illustrated in FIG. 10, the guide member 66 includes a flange portion 661, a guide portion (not illustrated), and a rotation shaft 662. The flange portion 661 is formed in a substantially disk shape and has an outer diameter larger than an outer diameter of the decurling belt 61. The guide portion is formed in a short cylindrical shape on an inner side surface of the flange portion 661. The guide portion rotatably guides an end portion of the decurling belt 61. The rotation shaft 662 includes a columnar metal embedded in the center of an outer side surface of the flange portion 661 to protrude outward.

As illustrated in FIG. 9, in the correction belt unit 65, the rotation shaft 662 of the guide member 66 is rotatably attached to a second support arm 72 via a bearing member 663.

The second support arm 72 is attached to the opening and closing cover 433 in a state of being fixed to inner side surfaces of both end portions of the opening and closing cover 433 in the longitudinal direction. The opening and closing cover 433 is opened and closed around the support shaft 73 via the second support arm 72.

As illustrated in FIG. 9, the second support arm 72 is formed of a sheet metal or the like having a predetermined thickness. The second support arm 72 includes a base end. portion 721, an intermediate portion 722, and a substantially rectangular tip portion 723. The base end portion 721 is rotatably supported by the support shaft 73. The intermediate portion 722 extends horizontally from the base end portion 721 and then bent obliquely downward. The tip portion 723 is provided on a side of the intermediate portion 722. The base end portion 721 of the second support arm 72 is rotatably supported by the support shaft 73 via an elongated hole 724. The elongated hole 724 elongates in the major axis direction along a straight line L connecting the support shaft 73 and the rotation shaft 662 of the decurling belt 61. The elongated hole 724 is formed in an elliptical shape and has an opening width corresponding to the outer diameter of the support shaft 73 in a minor axis direction intersecting the major axis direction thereof. Therefore, the second support arm 72 is attached to the support shaft 73 in a manner of being positioned in the minor axis direction while being movable in the major axis direction of the elongated hole 724.

The rotation shaft 725 is rotatably provided in the tip portion 723 of the second support arm 72 via a bearing member 726. The operation handle 433*a* of the opening and closing cover 433 is rotatably attached to an upper end portion of the rotation shaft 725. As described above, the bearing member 663 that rotatably supports the rotation shaft 662 of the decurling belt 61 is attached to a lower end portion of the tip portion723 of the second support arm 72.

Figure 14:
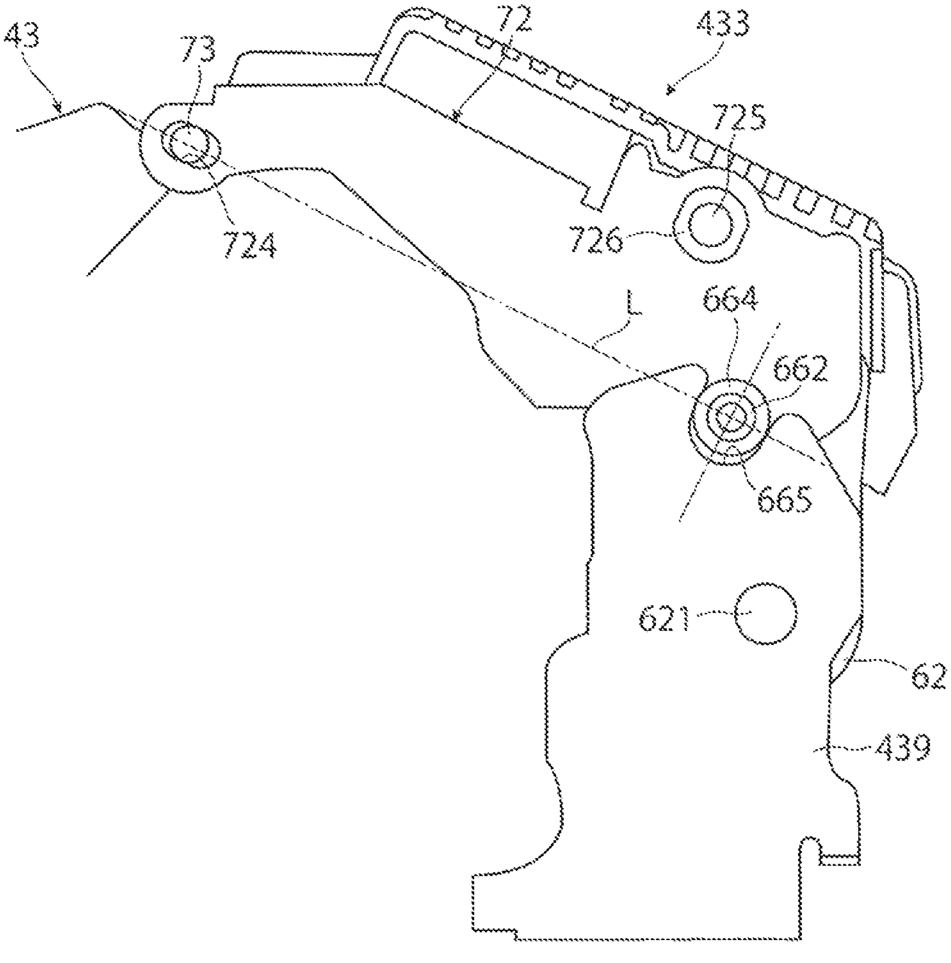
FIG. 14 is a cross-sectional view illustrating a part of a positioning structure of a second support arm of the fixing device according to the first exemplary embodiment of the present disclosure.

As illustrated in FIGS. 14, a positioning roller 664 is rotatably provided on the rotation shaft 662 of the decurling belt 61. When the opening and closing cover 433 is closed, the positioning roller 664 is fitted into positioning portions 665 formed of recessed grooves in auxiliary frames 439 provided inside the device housing 43, so that the second support arm 72 is positioned. The recessed groove constituting the positioning portion 665 is formed in a substantially U shape along a direction intersecting with the straight line L connecting the support shaft 73 and the rotation shaft 662 of the decurling belt 61. Therefore, when the positioning roller 664 is fitted to the positioning portion 665, the rotation shaft 662 of the decurling belt 61 is positioned in the direction extending along the straight line L connecting the support shaft 73 and the rotation shaft 662 of the decurling belt 61. The position of the rotation shaft 662 of the decurling belt 61 in the direction intersecting the straight line L is determined by the minor axis direction of the elongated hole 724 provided in the base end portion 721 of the second support arm 72.

Figure 12:
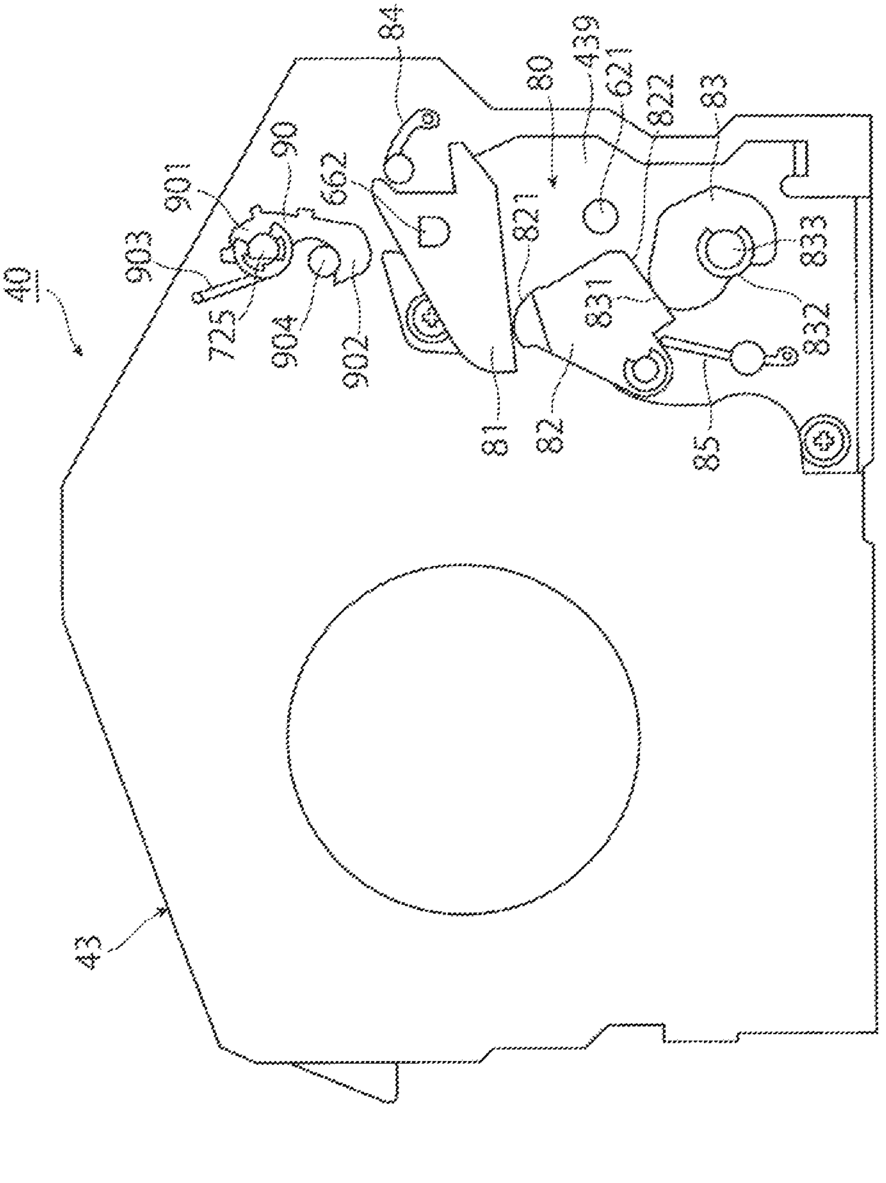
FIG. 12 is a side view illustrating a switching mechanism of the decurling device.

As illustrated in FIG. 12, the opening and closing cover 433 is provided with a stopper member 90 (an example of a release unit). The stopper member 90 holds the opening and closing cover 433 in a closed state and releases the pressure contact between the decurling belt 61 and the decurling roller 62 by opening the opening and closing cover 433. The stopper member 90 includes a base end portion 901 fixed to the rotation shaft 725 and a tip portion 902 having a substantially J-shaped side surface. The stopper member 90 is biased in the clockwise direction by a coil spring 903 wound around the rotation shaft 725. The tip portion 902 of the stopper member 90 is engaged with an engagement pin 904 provided on a frame of the device housing 43. When the tip portion 902 of the stopper member 90 is engaged with the engagement pin 904, the opening and closing cover 433 is positioned in the closed state.

As described above, the operation handle 433*a* (see FIG. 4) for opening and closing the opening and closing cover 433 is attached and fixed to the rotation shaft 725. The opening and closing cover 433 is biased in an opening direction by a spring provided at the base end portion 711 of the first support arm 71. Therefore, when the opening and closing cover 433 is closed, the opening and closing cover 433 is stopped in a state where the tip portion 902 of the stopper member 90 is engaged with the engagement pin 904 of the device housing 43.

As illustrated in FIG. 10, the felt 67 is formed in an elongated rectangular shape in a cross section over substantially the entire length of the decurling belt 61. The felt 67 is provided on an upper end surface of the support frame 64 by adhesion or the like. The felt 67 is impregnated with a predetermined amount of lubricant to be supplied in a state of being applied to the inner peripheral surface of the decurling belt 61. The lubricant reduces a sliding resistance between the decurling belt 61 and the pressure contact member 63. As the lubricant, for example, an amino-modified silicone oil having a viscosity of 100 cs or more and 350 cs or less is used. The felt 67 is impregnated with the lubricant in advance, and the lubricant is applied and supplied to the inner peripheral surface of the decurling belt 61. It is noted that the present disclosure is not limited thereto. Alternatively, the lubricant may be supplied in a state of being applied to the inner peripheral surface of the decurling belt 61 initially.

Figure 13:
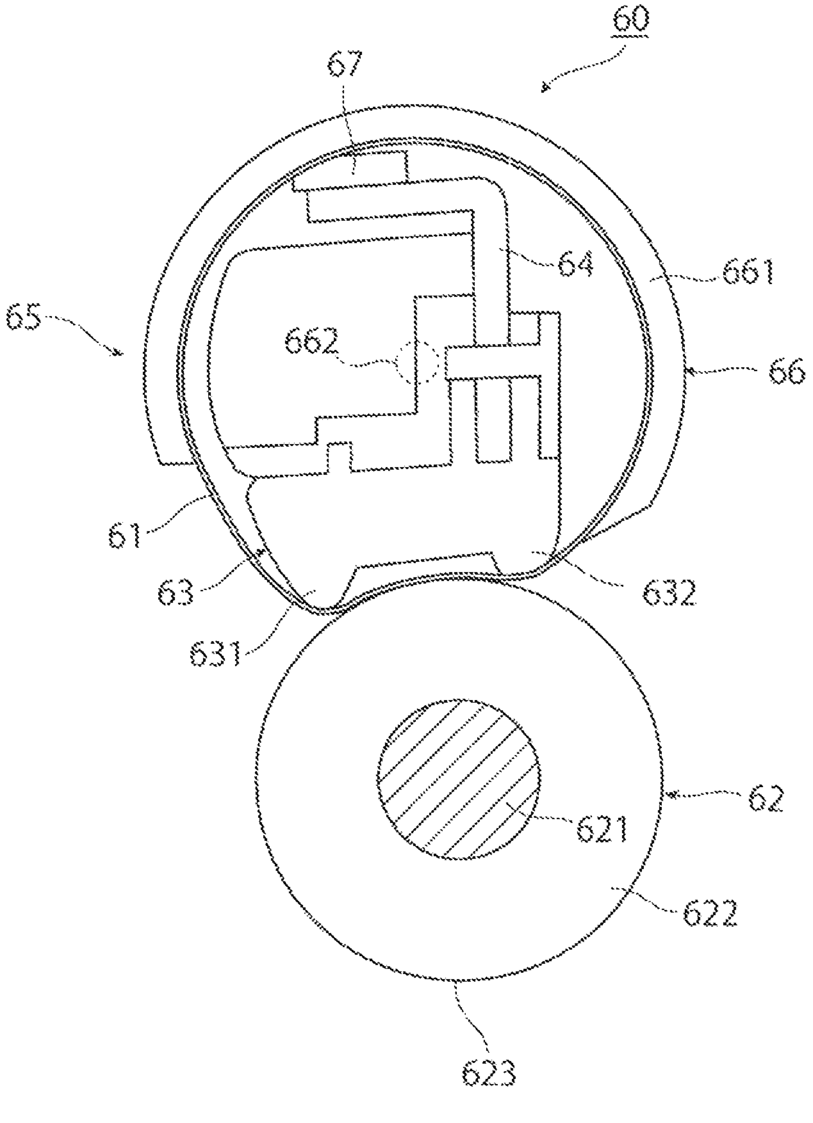
FIG. 13 is a cross-sectional view illustrating a second position of the decurling device.

As illustrated in FIG. 12, the correction belt unit 65 can switch a pressure contact state with respect to the decurling roller 62 by being rotated about the rotation shaft 662 by a switching mechanism 80 (an example of a switching unit). Swing arms 81 are attached and fixed to both end portions of the correction belt unit 65 in the axial direction of the rotation shaft 662. The end portions of the correction belt unit 65 have substantially D-shaped side surfaces. By rotating the correction belt unit 65 about the rotation shaft 662, the correction belt unit 65 can be switched between a first position (first state) and a second position (second state). In the first position, the second projection portion 632 of the pressure contact member 63 penetrates into the surface of the decurling roller 62 with a relatively large pressure contact force as illustrated in FIG. 10. In the second position, both the first and second projection portions 631 and 632 of the pressure contact member 63 come into contact with the surface of the deciding roller 62 with a relatively small pressure contact force via the decurling belt 61 or face the surface of the decurling roller 62 via a gap as illustrated in FIG. 13.

When the correction belt unit 65 is rotated to the first position, the second projection portion 632 is brought into pressure contact with the surface of the deciding roller 62 so as to penetrate into the surface of the deciding roller 62 with the relatively large pressure contact force via the decurling belt 61, and corrects the recording sheet 5 that is curved in the upward convex shape and passes between the decurling belt 61 and the decurling roller 62 into a planar shape.

When the correction belt unit 65 is rotated to the second position, the first and second projection portions 631 and 632 come into contact with the surface of the decurling roller 62 with the relatively small pressure contact force via the decurling belt 61, and corrects the recording sheet 5 that is curved in the downward convex shape and passes between the decurling belt 61 and the deciding roller 62 into a planar shape.

As illustrated in FIG. 12, the switching mechanism 80 includes the swing arm 81, an intermediate cam 82, and a second eccentric cam 83. The swing arm 81 has a substantially triangular side surface and is attached and fixed to an end portion of the rotation shaft 662 of the guide member 66 in the correction belt unit 65. The intermediate cam 82 abuts against a tip portion of the swing arm 81 to rotate the swing arm 81. The second eccentric cam 83 rotates the intermediate cam 82. The swing arm 81 is fixed to the rotation shaft 662 of the guide member 66 in the vicinity of a base end portion formed in a substantially triangular shape on a side surface. The swing arm 81 is biased by a spring 84 to rotate in the counterclockwise direction. The intermediate cam 82 is formed in a substantially trapezoidal shape on a side surface. The intermediate cam 82 has a curved portion 821 that comes into contact with the swing arm 81 and a straight portion 822 that comes into contact with the second eccentric cam 83. The intermediate cam 82 is biased by a spring 85 to rotate in the clockwise direction and come into contact with the second eccentric cam 83. The second eccentric cam 83 is formed in a substantially oval shape. The second eccentric cam 83 has a first pressurizing portion 831 having the largest radius and a second pressure contact portion 832 having the smallest radius. The first pressurizing portion 831 and the second pressure contact portion 832 are connected by a smooth curved surface. A rotation shaft 833 of the second eccentric cam 83 is rotationally driven by a driving motor (not illustrated) disposed on a front surface side of the device housing 43. Therefore, the second eccentric cam 83 switches between a first position where the decurling belt 61 is brought into pressure contact with the decurling roller 62 and a second position where the decurling belt 61 is brought into contact with the decurling roller 62 with a weak force.

As illustrated in FIG. 10, the decurling roller 62 includes a metal core 621, an elastic body layer 622, and a release layer 623. The metal core 621 is formed in a columnar shape. The elastic body layer 622 is made of a foamed or non-foamed elastic body or the like that is relatively thickly coated on an outer peripheral surface of the core 621. The release layer 623 is coated on a surface of the elastic body layer 622. The core 621 of the decurling roller 62 is rotatably attached to the frame of the device housing 43. The decurling roller 62 is rotationally driven in a direction indicated by an arrow F by a driving device (not illustrated) disposed in front of the device housing 43. As illustrated in FIG. 14, both end portions of the core 621 of the decurling roller 62 in the axial direction thereof are rotatably attached to the auxiliary frames 439, respectively. The auxiliary frames 439 are disposed at both end portions of the device housing 43 in the longitudinal direction thereof.

Incidentally, in the fixing device 40 configured as described above, when a so-called jam, which is a transport failure of the recording sheet 5 such as a jam of the recording sheet 5, occurs inside the fixing device 40 or the like, the first and second eccentric cams 56 and 83 are rotationally driven by a driving device (not illustrated), a pressurized state between the heating roller 41 and the pressurizing belt 42 is released, and a pressure contact state between the decurling belt 61 and the decurling roller 62 is also released. The first and second eccentric cams 56 and 83 are rotationally driven in conjunction with each other by the driving device (not illustrated) to bring the heating roller 41 and the pressurizing belt 42 into the pressurized state and bring the decurling belt 61 and the decurling roller 62 into the pressure contact state. The first and second eccentric cams 56 and 83 are rotationally driven in conjunction with each other by the driving device (not illustrated) to release the pressurized state between the heating roller 41 and the pressurizing belt 42 and release the pressure contact state between the decurling belt 61 and the decurling roller 62.

Then, a front cover (not illustrated) of the apparatus body 1*a* of the image forming apparatus 1 is opened by the user, and the sheet transport unit 300 to which the fixing device 40 is attached is pulled out to the front side of the apparatus body 1*a*. As a result, the fixing device 40 is exposed to the outside together with the sheet transport unit 300 pulled out to the front side of the apparatus body 1*a*.

Thereafter, the opening and closing cover 433 of the fixing device 40 is opened by the user, and the recording sheet 5 in which the transport failure has occurred inside the fixing device 40 is removed.

However, in the fixing device 40, when a power failure occurs during an image forming operation, or when a user opens the front cover (not illustrated) of the image forming apparatus 1 and pulls out the sheet transport unit 300 during a machine operation, an interlock switch (not illustrated) operates to interrupt energization., the first and second. eccentric cams 56 and 83 of the fixing device 40 may not be rotationally driven by the driving device (not illustrated), the heating roller 41 and the pressurizing belt 42 may remain in the pressurized state, and the decurling belt 61 and the decurling roller 62 may remain in the pressure contact state.

In this state, in order to remove the recording sheet 5 that has caused the transport failure inside the fixing device 40 or the like, the user may perform an operation of opening the opening and closing cover 433 of the fixing device 40, removing the recording sheet 5, which has caused the transport failure inside the fixing device 40, and then closing the opening and closing cover 433.

Then, in the fixing device 40, the decurling belt 61 and the decurling roller 62 are in pressure contact with each other with a relatively large pressure as illustrated in FIG. 8. Therefore, when the opening and closing cover 433 is closed, as illustrated in FIG. 10, the pressure contact member 63 of the decurling belt 61 attached to the opening and closing cover 433 is brought into pressure contact with the elastic body layer 622 of the decurling roller 62, and an excessive force may be applied to close the opening and closing cover 433.

As a result, in the image forming apparatus l, the sheet transport unit 300 to which the fixing device 40 is attached may be pushed down by a large force when the opening and closing cover 433 of the fixing device 40 is closed, and the guide rail (not illustrated) that slidably supports the sheet transport unit 300 may be deformed, or the sheet transport unit 300 itself may be deformed.

Therefore, the image forming apparatus including the fixing device to which the decurling device according to the exemplary embodiment is applied includes a restricting unit that restricts the release of the pressure contact between the pair of decurling units when the pair of decurling units is in a first state.

In the exemplary embodiment, the restricting unit restricts (prevents) the opening and closing unit from being opened.

Figure 16:
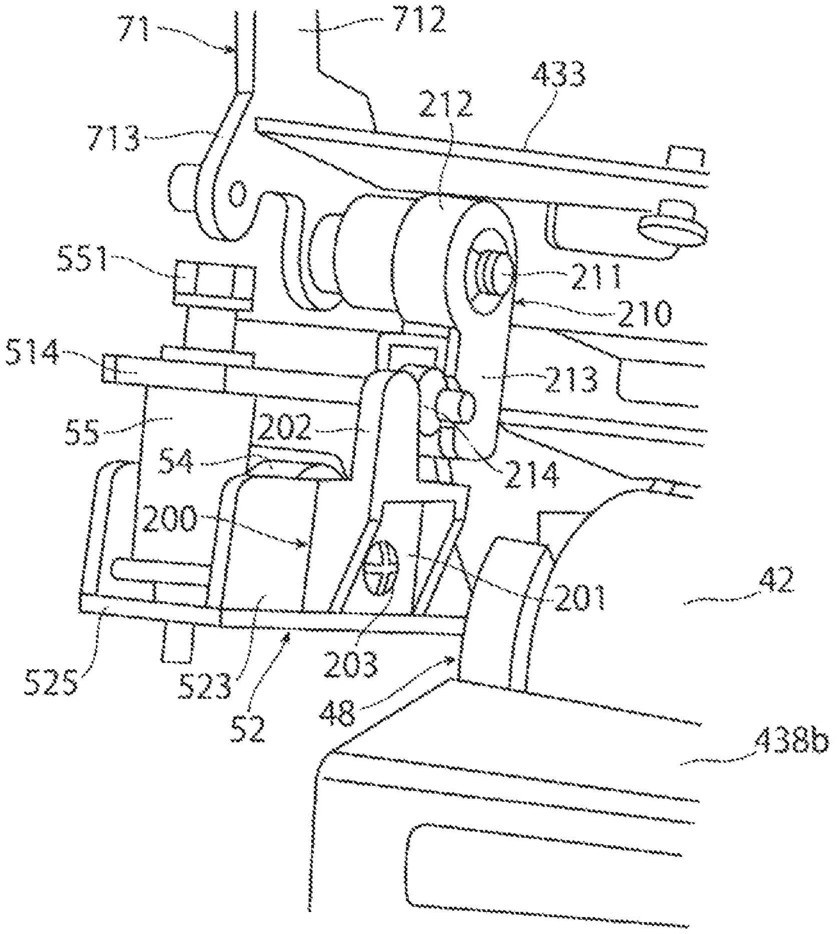
FIG. 16 is a perspective view illustrating a part of the fixing device according to the first exemplary embodiment of the present disclosure.

That is, in the fixing device 40 to which the decurling device 60 according to the first exemplary embodiment is applied, as illustrated in FIGS. 8 and 16, a restricting member 200 is attached to the action arm 52 of the retraction mechanism 50 that moves the pressurizing unit 45 in directions in which the pressurizing unit 45 pressurizes and separates from the heating roller 41. The restricting member 200 is an example of a restricting unit and restricts the opening of the opening and closing cover 433.

As illustrated in FIGS. 8 and 16, the restricting member 200 is made of synthetic resin or the like and has a substantially L-shape side surface. The restricting member 200 includes a base end portion 201 and a protruding portion 202. The base end portion 201 is fixed to the tip portion 523 of the action arm 52 by a screw 203. The protruding portion 202 protrudes upward from one side of the base end portion 201.

An abutting member 210 is attached to the tip portion 713 of the first support arm 71. The abutting member 210 is an example of a restricting unit. The abutting member 210 abuts against the protruding portion 202 of the restricting member 200 to thereby restrict (prevent) rotation of the first support arm 71 in the counterclockwise direction in the figure and consequently restricts opening of the opening and closing cover 433.

As illustrated in FIG. 16, the abutting member 210 includes a cylindrical portion 212, an abutting portion 213, and a roller 214. The cylindrical portion 212 is formed of a synthetic resin or the like in a columnar or cylindrical shape. The cylindrical portion 212 is attached to the tip portion 713 of the first support arm 71 so as to be rotatable about a shaft 211. The abutting portion 213 protrudes downward from the cylindrical portion 212. The roller 214 is rotatably supported on a side surface of the abutting portion 213.

The abutting member 210 is biased in the counterclockwise direction in the figure by a coil spring 215 (see FIG. 8) wound around the cylindrical portion 212. The position of the abutting member 210 in the counterclockwise direction is locked by a locking portion (not illustrated). The abutting member 210 is not rotatable in the counterclockwise direction beyond the locking position.

As illustrated in FIGS. 8 and 16, as the action arm 52 rotates in the clockwise direction, the protruding portion 202 of the restricting member 200 attached to the tip portion 523 of the action arm 52 comes into contact with the roller 214 rotatably supported by the side surface of the abutting portion 213, and the abutting member 210 slightly rotates in the clockwise direction. At this time, the roller 214 of the abutting member 210 remains abutted against the protruding portion 202 of the restricting member 200 by a biasing force of the coil spring 215.

Therefore, as illustrated in FIGS. 8 and 16, in the fixing device 40, when the heating roller 41 and the pressurizing belt 42 remain in the pressurized state and the decurling belt 61 and the decurling roller 62 remain in the pressure contact state, the abutting member 210 of the first support arm 71 abuts against the tip portion 523 of the action arm 52, and the first support arm 71 is restricted from rotating in the counterclockwise direction. As a result, the opening and closing cover 433 is restricted (prevented) from being opened.

In the fixing device 40 according to the first exemplary embodiment, the driving devices (not illustrated) that rotationally drive the first and second eccentric cams 56 and 83 are interlocked. When the heating roller 41 and the pressurizing belt 42 are in the pressurized state and the decurling belt 61 and the decurling roller 62 are in the pressure contact state, the opening of the opening and closing cover 433 is restricted (prevented).

In the image forming apparatus 1, during non-printing in which no image forming operation is executed, as illustrated in FIG. 9, the action arm 52 is retracted downward, the pressurized state between the heating roller 41 and the pressurizing belt 42 is released, and the pressure contact state between the decurling belt 61 and the decurling roller 62 is also released. Therefore, the fixing device 40 allows the opening and closing cover 433 to be opened and enter an open state.

In the image forming apparatus 1, even when the heating roller 41 and the pressurizing belt 42 are in the pressurized state as illustrated in FIG. 13, the decurling belt 61 and the decurling roller 62 may be in contact with each other at a relatively low pressure at the second position.

In this case, in the fixing device 40, since the decurling belt 61 and the decurling roller 62 are in contact with each other at the relatively low pressure, even if the opening and closing cover 433 is opened, no excessive force is applied when closing the opening and closing cover 433. Therefore, in the fixing device 40, although no failure occurs even when the opening and closing cover 433 is opened, if the heating roller 41 and the pressurizing belt 42 are in the pressurized state, the opening and closing cover 433 is restricted from being released and safety is ensured.

Effect of Decurling Device

In the fixing device 40 including the decurling device 60 according to the first exemplary embodiment, it makes possible to restrict the release of the pressure contact between the pair of decurling units in a state in which the pressure contact force is relatively high, as follows.

That is, in the fixing device 40 according to the first exemplary embodiment, as illustrated in FIG. 3. when the unfixed toner images T are fixed on the recording sheet 5 and the curl of the recording sheet 5 subjected to the fixing processing is corrected by the decurling device 60, a transport failure) of the recording sheet 5 may occur.

More specifically, in the fixing device 40, as illustrated in FIG. 3, a transport failure called a jam may occur in which the recording sheet 5 is jammed (i) at the outlet of the fixing nip portion N where the heating roller 41 and the pressurizing belt 42 are in pressure contact with each other, (ii) between the fixing nip portion N and the decurling device 60, or the like.

In the image forming. apparatus 1 to which the fixing device 40 according to the first exemplary embodiment is applied, when a transport failure of the recording sheet 5 occurs in the region of the fixing device 40, the fixing device 40 is exposed to the outside by pulling out the sheet transport unit 300 to the front side as illustrated in FIG. 1.

In the fixing device 40, as illustrated in FIG. 4. when the operation handle 433*a* provided on the second inclined surface portion 432 of the device housing 43 is rotated upward, the stopper member 90 is rotated in the counterclockwise direction via the rotation shaft 725 as illustrated in FIG. 12, and an engagement between the tip portion 902 and the engagement pin 904 of the stopper member 90 is released.

Figure 15:
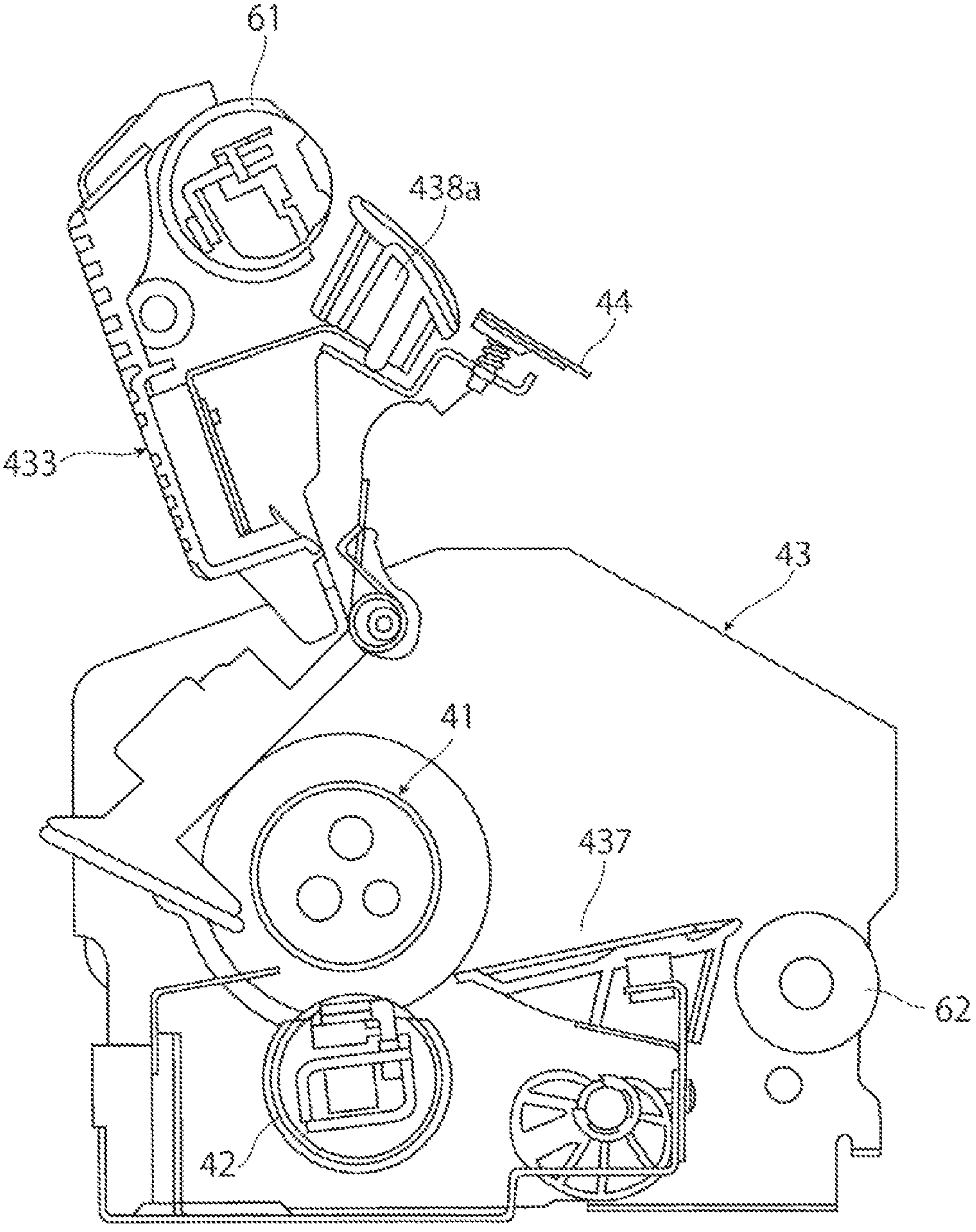
FIG. 15 is a cross-sectional view illustrating the fixing device according to the first exemplary embodiment of the present disclosure in a state in which an opening and closing cover is opened.

Then, as illustrated in FIG. 15, the fixing device 40 is set in a state in which the opening and closing cover 433 is operable and closable. Then, in the fixing device 40, when the opening and closing cover 433 is opened and brought in the opening state, the peeling claw 44 attached to the opening and closing cover 433 via the first support arm 71 is separated from the surface of the heating roller 41, the decurling belt 61 attached to the second support arm 72 integrated with the opening and closing cover 433 is separated from the decurling roller 62, and the transport path 437 formed between (i) the fixing nip portion N and (ii) the decurling belt 61 and the decurling roller 62 is exposed to the outside.

Therefore, in the sheet transport unit 300 pulled out to the front side of the apparatus body 1*a*, the user can easily remove, from the fixing device 40 exposed to the outside and in which the opening and closing cover 433 is released, the recording sheet 5 which has caused the transport failure in the transport path 437 or the like between (i) the fixing nip portion N and (ii) the decurling belt 61 and the decurling roller 62.

Thereafter, in the fixing device 40 from which the recording sheet 5, which caused the transport failure, has been removed, the opening and closing cover 433 is closed by the user, and the sheet transport unit 300 is housed at a predetermined operation position inside the apparatus body 1*a*.

At this time, in the fixing device 40, when the opening and closing cover 433 is closed, as illustrated in FIG. 12, the stopper member 90 of the opening and closing cover 433 is engaged with the engagement pin 904 of the device housing 43, and the opening and closing cover 433 is positioned and fixed at a predetermined closing position relative to the device housing 43.

However, in the fixing device 40 according to the first exemplary embodiment, when the power failure occurs, or when the user opens the front cover (not illustrated) of the image forming apparatus 1 and pulls out the sheet transport unit 300 during the machine operation, the interlock switch (not illustrated) operates to interrupt energization, the first and second eccentric cams 56 and 83 of the fixing device 40 may not be rotationally driven by the driving device (not illustrated), the heating roller 41 and the pressurizing belt 42 may remain in the pressurized state, and the decurling belt 61 and the decurling roller 62 may remain in the pressure contact state.

In this state, in order to remove the recording sheet 5 which has caused the transport failure inside the fixing device 40 or the like, the user may perform an operation of opening the opening and closing cover 433 of the fixing device 40.

At this time, in the fixing device 40 according to the first exemplary embodiment, as illustrated in FIGS. 8 and 16, the first and second eccentric cams 56 and 83 may not rotate to the retracted positions, the heating roller 41 and the pressurizing belt 42 may remain in the pressurized state, and the decurling belt 61 and the decurling roller 62 may also remain in the pressure contact state.

Then, as illustrated in FIGS. 8 and 16, in the fixing device 40, when the heating roller 41 and the pressurizing belt 42 remain in the pressurized state and the decurling belt 61 and the decurling roller 62 remain in the pressure contact state, the abutting member 210 of the first support arm 71 abuts against the tip portion 523 of the action arm 52, and the first support arm 71 is restricted from rotating in the counterclockwise direction. As a result, the opening and closing cover 433 is restricted (prevented) from being opened.

Therefore, in the fixing device 40, since the opening and closing cover 433 is not opened by the user, when the opening and closing cover 433 is closed, it can be avoided or prevented that the pressure contact member 63 of the decurling belt 61 attached to the opening and closing cover 433 is brought into pressure contact with the elastic body layer 622 of the decurling roller 62 and that an excessive force is applied to close the opening and closing cover 433.

Therefore, in the image forming apparatus 1, it is prevented that the sheet transport unit 300 to which the fixing device 40 is attached is pushed down by a relatively large force when the opening and closing cover 433 of the fixing device 40 is closed and that the guide rail (not illustrated) that slidably supports the sheet transport unit 300 and the sheet transport unit 300 itself are deformed.

In this manner, in the image forming apparatus 1 to which the fixing device 40 configured as described above is applied, when a power failure occurs, or when a user opens the front cover (not illustrated) of the image forming apparatus 1 and pulls out the sheet transport unit 300 during a machine operation, the interlock switch (not illustrated) operates to interrupt energization, it is possible to prevent the opening and closing cover 433 of the fixing device 40 from being opened improperly and to restrict the release of the pressure contact between the decurling belt 61 and the decurling roller 62 in a state in which the pressure contact force is relatively high.

In the above exemplary embodiments, the image forming. apparatus that forms a. full-color image has been described as an example of the image forming apparatus. It is needless to say that the image forming apparatus is not limited thereto, and may be one that forms a monochrome image.

In the above exemplary embodiment, the first support arm 71 and the second support arm 72 are rotatably supported by the same support shaft 73. It is noted that the present disclosure is not limited thereto. Alternatively, the first support arm 71 and the second support arm 72 may be rotatable about different fulcrums. For example, the second support arm 72 may be rotatably supported by the support shaft 73, and the first support arm 71 may be rotatably supported by a support shaft different from the support shaft 73 of the device housing 43, or the first support arm 71 may be rotatably attached to the second support arm 72.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A decurling device comprising:

a pair of decurling units configured to correct curl of a recording medium by sandwiching the recording medium;

a switching unit configured to switch the pair of decurling units between a first state in which a pressure contact force is relatively large and a second state in which the pressure contact force is smaller than that in the first state;

a release unit configured to release a pressure contact between the pair of decurling units; and a restricting unit configured to prohibit release of the pressure contact between the pair of decurling units when the pair of decurling units are in the first state; and an opening and closing unit provided in an apparatus body so as to be openable and closable, wherein the restricting unit prohibits opening of the opening and closing unit when the pair of decurling units are in the first state.

2. The decurling device according to claim 1, wherein the release unit releases the pressure contact by separating one of the pair of decurling units from the other of the pair of decurling units.

3. The decurling device according to claim 2, wherein the one of the pair of decurling units is attached to an opening and closing unit provided in an apparatus body so as to be openable and closable.

4. The decurling device according to claim 3, wherein the restricting unit restricts opening of the opening and closing unit.

5. The decurling device according to claim 4, wherein the one of the pair of decurling units comprises a pressure contact unit disposed inside an endless belt, the pressure contact unit being configured to come into pressure contact with the other of the pair of decurling units.

6. The decurling device according to claim 5, wherein the switching unit switches the pressure contact force by rotating the one of the pair of decurling units.

7. A fixing device comprising:

a fixing unit configured to fix an image on a recording medium; and the decurling device according to claim 6, the decuring device being configured to correct the curl of the recording medium.

8. An image forming apparatus comprising:

an image forming unit configured to form an image on a recording medium;

a fixing unit configured to fix the image on the recording medium; and the decurling device according to claim 6, the decuring device being configured to correct the curl of the recording medium.

9. A fixing device comprising:

a fixing unit configured to fix an image on a recording medium; and the decurling device according to claim 5, the decuring device being configured to correct the curl of the recording medium.

10. An image forming apparatus comprising:

an image forming unit configured to form an image on a recording medium;

a fixing unit configured to fix the image on the recording medium; and the decurling device according to claim 5, the decuring device being configured to correct the curl of the recording medium.

11. A fixing device comprising:

a fixing unit configured to fix an image on a recording medium; and the decurling device according to claim 4, the decuring device being configured to correct the curl of the recording medium.

12. An image forming apparatus comprising:

an image forming unit configured to form an image on a recording medium;

a fixing unit configured to fix the image on the recording medium; and the decurling device according to claim 4, the decuring device being configured to correct the curl of the recording medium.

13. A fixing device comprising:

a fixing unit configured to fix an image on a recording medium; and the decurling device according to claim 3, the decuring device being configured to correct the curl of the recording medium.

14. An image forming apparatus comprising:

an image forming unit configured to form an image on a recording medium;

a fixing unit configured to fix the image on the recording medium; and the decurling device according to claim 3, the decuring device being configured to correct the curl of the recording medium.

15. A fixing device comprising:

a fixing unit configured to fix an image on a recording medium; and the decurling device according to claim 2, the decuring device being configured to correct the curl of the recording medium.

16. An image forming apparatus comprising:

an image forming unit configured to form an image on a recording medium;

a fixing unit configured to fix the image on the recording medium; and the decurling device according to claim 2, the decuring device being configured to correct the curl of the recording medium.

17. A fixing device comprising:

a fixing unit configured to fix an image on a recording medium; and the decurling device according to claim 1, the decuring device being configured to correct the curl of the recording medium.

18. An image forming apparatus comprising:

an image forming unit configured to form an image on a recording medium;

a fixing unit configured to fix the image on the recording medium; and the decurling device according to claim 1, the decuring device being configured to correct the curl of the recording medium.

19. A decurling device comprising:

first and second decurling means for correcting curl of a recording medium by sandwiching the recording medium;

switching means for switching the first and second decurling means between a first state in which a pressure contact force is relatively large and a second state in which the pressure contact force is smaller than that in the first state;

release means for releasing a pressure contact between the first and second decurling means; and restricting means for prohibiting release of the pressure contact between the first and second decurling means when the first and second decurling means are in the first state; and an opening and closing unit provided in an apparatus body so as to be openable and closable, wherein the restricting unit prohibits opening of the opening and closing unit when the pair of decurling units are in the first state.

* * * * *